United States Patent [19]
Koster et al.

[11] Patent Number: 5,239,570
[45] Date of Patent: Aug. 24, 1993

[54] 9-1-1 SWITCHED ACCESS SYSTEM

[75] Inventors: Arnold J. Koster, Carnation; Alexander D. Vdolek, Redmond; Raymond Ma, Seattle, all of Wash.

[73] Assignee: Teltone Corporation, Kirkland, Wash.

[21] Appl. No.: 558,689

[22] Filed: Jul. 25, 1990

[51] Int. Cl.⁵ ............................................ H04M 11/04
[52] U.S. Cl. .................................... 379/45; 379/32; 379/279
[58] Field of Search ................ 379/45, 279, 265, 266, 379/221, 210, 213, 107, 32

[56] References Cited

U.S. PATENT DOCUMENTS

| | | | |
|---|---|---|---|
| 3,881,060 | 4/1975 | Connell et al. | 179/5.5 |
| 4,310,726 | 1/1982 | Asmuth | 179/18 B |
| 4,400,587 | 8/1983 | Taylor et al. | 379/266 |
| 4,450,320 | 5/1984 | Ostermann et al. | 179/5 R |
| 4,565,903 | 1/1986 | Riley | 179/18 B |
| 4,577,066 | 3/1986 | Bimonte et al. | 179/18 B |
| 4,611,096 | 9/1986 | Asmuth et al. | 179/18 B |
| 4,819,261 | 4/1989 | Takeda et al. | 379/32 |
| 4,837,799 | 6/1989 | Prohs et al. | 379/224 |
| 4,839,892 | 6/1989 | Sasaki | 370/95 |
| 4,893,325 | 1/1990 | Pankonen et al. | 379/210 |

OTHER PUBLICATIONS

Bell Communications Technical Reference TR-T-SY-000350 Entitled "E911 Public Safety Answering Point . . ." Nov. 1987.
Bell Laboratories Record entitled "Enhanced 911:emergency calling with a plus" by Denigris et al., Mar. 1980.
Telphony Magazine, Article entitled "Making 911 even better" by Delong Jr., Dec. 14, 1987, pp. 60-63.

Primary Examiner—James L. Dwyer
Assistant Examiner—Admad F. Matar
Attorney, Agent, or Firm—Christensen, O'Connor, Johnson & Kindness

[57] ABSTRACT

A switched access emergency (i.e., 9-1-1) telephone system that uses the trunks of a public telephone network (PTN) with the same reliability as a 9-1-1 telephone system that uses a dedicated line is disclosed. The switched access system includes a trunk dial unit (TDU) connected to the central office receiving 9-1-1 calls and a call access unit (CAU) connected to the 9-1-1 public service answering point (PSAP) that the caller desires to contact. 9-1-1 calls to the caller's central office are directed to the TDU, which calls the PSAP via the PTN and the CAU. The TDU captures the automatic number identification (ANI) information associated with the calling telephone and sends the ANI information to the PSAP when requested to do so. During idle periods, the TDU regularly communicates with the CAU via the PTN to determine the availability of the CAU and, thus, the PSAP. The TDU can be programmed to contact one or more secondary PSAPs if a primary PSAP is unavailable. In such embodiments of the invention, the TDU regularly communicates with the CAUs associated with the alternative PSAPs to determine the availability of the CAUs and, thus, their associated PSAPs, if the CAU associated with the primary PSAP has failed, the primary PSAP has failed or no primary PSAP number has been programmed. Alternatively, or in addition, the TDU can be programmed to contact different primary and secondary PSAPs at different times of the day. Regardless of the complexity of the overall switched access system, failure of the TDU to contact one or more of the CAUs creates an audible and/or visual alarm that alerts maintenance personnel to the loss of communication capability.

32 Claims, 15 Drawing Sheets

9-1-1 SWITCHED ACCESS SYSTEM

TECHNICAL AREA

This invention relates to telephone communication networks and, more particularly, to emergency telephone systems.

BACKGROUND OF THE INVENTION

Major metropolitan areas of the United States, and some foreign countries, have an emergency telephone system that allows a caller having a need for emergency, e.g., medical or police, assistance to be connected to a location that can provide the assistance, commonly called a public service answering point (PSAP). In the U.S., a universal number—9-1-1—is used to access the emergency telephone system in areas where it is available. As a result, such systems have come to be known as 9-1-1 systems, as well as emergency telephone systems.

In the past, 9-1-1 systems have used dedicated lines to connect the local office receiving a 9-1-1 call to a PSAP. In areas of high population density, i.e., major metropolitan areas, the cost of dedicated lines is justified by the relatively short line runs and the relatively large use of 9-1-1 service on a per capita basis.

In recent years, attempts have been made to extend 9-1-1 service to rural communities and to communities located near, but outside of, major metropolitan areas. In the past, in order to maintain the reliability of 9-1-1 service, rural 9-1-1 systems, like metropolitan 9-1-1 systems, have used dedicated lines to couple rural central offices to a PSAP, which may be located in a central rural community or a nearby metropolitan area. While more reliable, dedicated lines are very expensive when compared with the shared trunks utilized by the public telephone network (PTN). More specifically, as well known to those familiar with telephone communication networks, the public telephone network comprises central offices that include switches that control telephone communication via trunks that connect the central offices together. Sharing of trunks reduces telephone call costs. Unfortunately, shared trunks are not as reliable as dedicated lines. Calls can be misdirected through central office switches and central office switches can break down, for example. On the other hand, dedicated lines are expensive, particularly when they are idle most of the time. In some cases, the high cost of dedicated lines has prohibited the implementation of 9-1-1 service, particularly in rural areas.

The present invention is directed to providing a public telephone network emergency telephone system having the same or greater reliability as does a dedicated line emergency telephone system.

SUMMARY OF THE INVENTION

In accordance with this invention, a switched access emergency (i.e., 9-1-1) telephone system that uses the public telephone network (PTN) in a way that achieves the same reliability as a 9-1-1 system that uses a dedicated line is provided. The switched access system includes a trunk dial unit (TDU) connected to the local central office receiving 9-1-1 calls and a call access unit (CAU) connected to the 9-1-1 public service answering point (PSAP) that the caller desires to contact. 9-1-1 calls to the caller's central office are directed to the TDU, which calls the PSAP via the PTN and the CAU. The TDU automatically captures the automatic number identification (ANI) information associated with the calling telephone and sends the captured ANI information to the PSAP when requested to do so. During idle periods, the TDU regularly communicates with the CAU via the PTN to determine the availability of the CAU and, thus, the PSAP. If the TDU is unable to communicate with the CAU, audible and/or visible alarms are created to indicate the communication failure to the maintenance personnel of a user of an embodiment of the invention.

In accordance with further aspects of this invention, the TDU is programmed to contact secondary or alternative PSAPs in the event a primary PSAP is unavailable. In such embodiments of the invention, the TDU communicates with the CAUs associated with the secondary or alternative PSAPs if the primary PSAP number is not programmed, the primary PSAP has failed, or the CAU associated with the primary PSAP has failed; and produces an alarm in the event of a communication failure with the secondary or alternative PSAPs.

In accordance with other or alternative aspects of this invention, the TDU is programmed to contact the CAUs associated with different PSAPs at different times of the day.

As will be readily appreciated from the foregoing description, the invention provides a 9-1-1 switched access system that uses the public telephone network (PTN) to provide emergency service with reliability that is equal to or greater than that provided by a 9-1-1 system that uses a dedicated line. In addition to great reliability, a 9-1-1 switched access system formed in accordance with the invention has substantial flexibility. In addition to being used as an independent system, it can function as a back-up to a 9-1-1 dedicated line system. It can be programmed to access a police or fire station connected to the same central office as the TDU in the event of a disaster that resulted in the loss of the PTN. In addition, embodiments of the invention can be used to access an alternate PSAP when a primary PSAP is busy and/or contact different PSAPs at different times of the day.

BRIEF DESCRIPTION OF THE DRAWINGS

The foregoing other features and advantages of this invention will become more readily appreciated as the same becomes better understood by reference to the following detailed description when taken in conjunction with the accompanying drawings wherein.

DESCRIPTION OF THE PREFERRED EMBODIMENT

Figure 1:
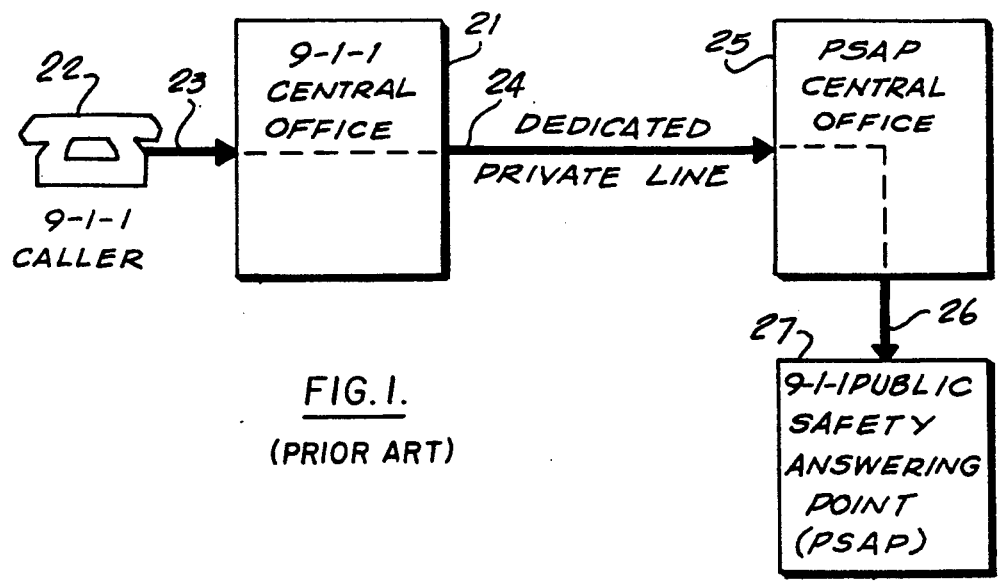
FIG. 1 is a block diagram of a prior art 9-1-1 system that uses a dedicated line.

FIG. 1 illustrates a prior art (dedicated line) 9-1-1 system. As is well known to those skilled in telephone art, dedicated line 9-1-1 systems include a central office 21 to which callers 22 are connected via separate lines 23. By virtue of the separate lines 23, any caller has the capability of making a 9-1-1 call, i.e., dialing the numbers nine-one-one. In response to a 9-1-1 call, the 9-1-1 trunk port, i.e., the trunk port to which 9-1-1 calls are sent, of the called central office 21 is connected, via a dedicated private line 24, to the central office 25 that is connected to a 9-1-1 public safety answering point (PSAP) 27 via a telephone line 26. When the PSAP 27 receives a call from a 9-1-1 caller 22, it answers the call and sends the required emergency assistance to the 9-1-1 caller. As briefly discussed above, the use of dedicated private lines makes prior art 9-1-1 systems expensive, particularly when the central office 21 that serves potential 9-1-1 callers 22 is geographically a considerable distance (e.g., several miles) from the central office 25 that serves the PSAP 27. While highly reliable, 9-1-1 dedicated lines 24 are expensive because they must be separately maintained even though they are only rarely used. While the same maintenance is required of the trunks of a public telephone network (PTN), the overall cost is considerably less because trunks are shared and, thus, used more often.

Figure 2:
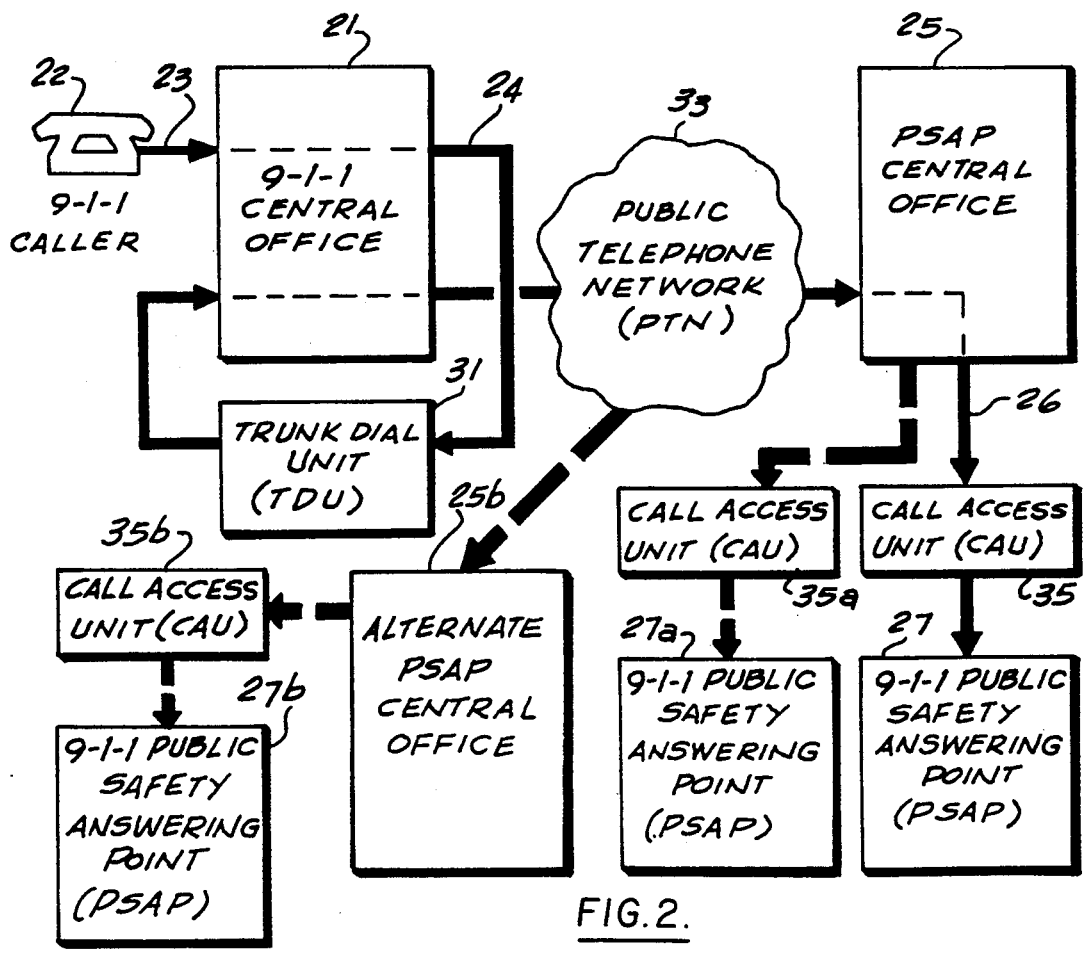
FIG. 2 is a block diagram of a 9-1-1 switched access system found in accordance with this invention.

FIG. 2 illustrates a 9-1-1 switched access system formed in accordance with the invention. Rather than the central office 21 that receives 9-1-1 calls (hereinafter 9-1-1 central office) being connected via a dedicated line to the central office that serves a PSAP (hereinafter PSAP central office), the 9-1-1 trunk port of the 9-1-1 central office is connected to the input of a trunk dial unit (TDU) 31. The TDU 31 is connected back through the 9-1-1 central office 21 via one of the line ports of the 9-1-1 central office to the trunks of the public telephone network (PTN) 33. In a conventional manner the PTN trunks connect the 9-1-1 central office 21 to the PSAP central office 25. Connected between the line port of the PSAP central office 25 that serves the PSAP 27 and the PSAP 27 is a call access unit (CAU) 35. In operation, when the 9-1-1 central office 21 receives a 9-1-1 call, the TDU 31 is enabled and dials the CAU 35 connected to the PSAP 27. More correctly, the TDU dials the line port of the PSAP central office to which the CAU is connected. In response, the PSAP central office sends a ring signal to the CAU. When the call is answered by the CAU 35, the CAU connects the PSAP 27 to the PSAP central office 25. As a result, the 9-1-1 caller 22 is connected to the PSAP 27 via the PTN. The TDU collects the automatic number identification (ANI) information associated with the calling telephone 22 and sends it to the PSAP when requested to do so.

During idle periods of time, the TDU and the CAU regularly communicate with one another via the PTN to make certain that a 9-1-1 call will be routed to the PSAP and not to some other location. In addition, internal tests are regularly performed by the TDU and the CAU to make certain-they are operating correctly. In the event of a communication or internal failure, audible and/or visible alarms are generated to alert maintenance personnel of the failure of the 9-1-1 switched access system so that corrective action can be taken.

In addition to a single or primary PSAP 27, as shown by dashed lines in FIG. 2, the TDU can be programmed to contact alternate PSAPs 27a and 27b under various conditions. In such embodiments of the invention, a call access unit 35a and 35b is associated with each PSAP 27a and 27b. The alternate or secondary PSAPs 27a and 27b can be contacted when the primary PSAP 27 is busy or during different times of day—evening, for example. Further, the alternate or secondary PSAPs can be connected to the same central office 25 as the primary PSAP 27 or to a different central office 25b. Although not shown in FIG. 2, the TDU can be programmed to call a PSAP connected to the 9-1-1 central office 21, such as the local police department, if a disruption in the PTN occurs that prevents a call being made to a primary PSAP 27 or a secondary PSAP 27a or 27b.

Figure 3:
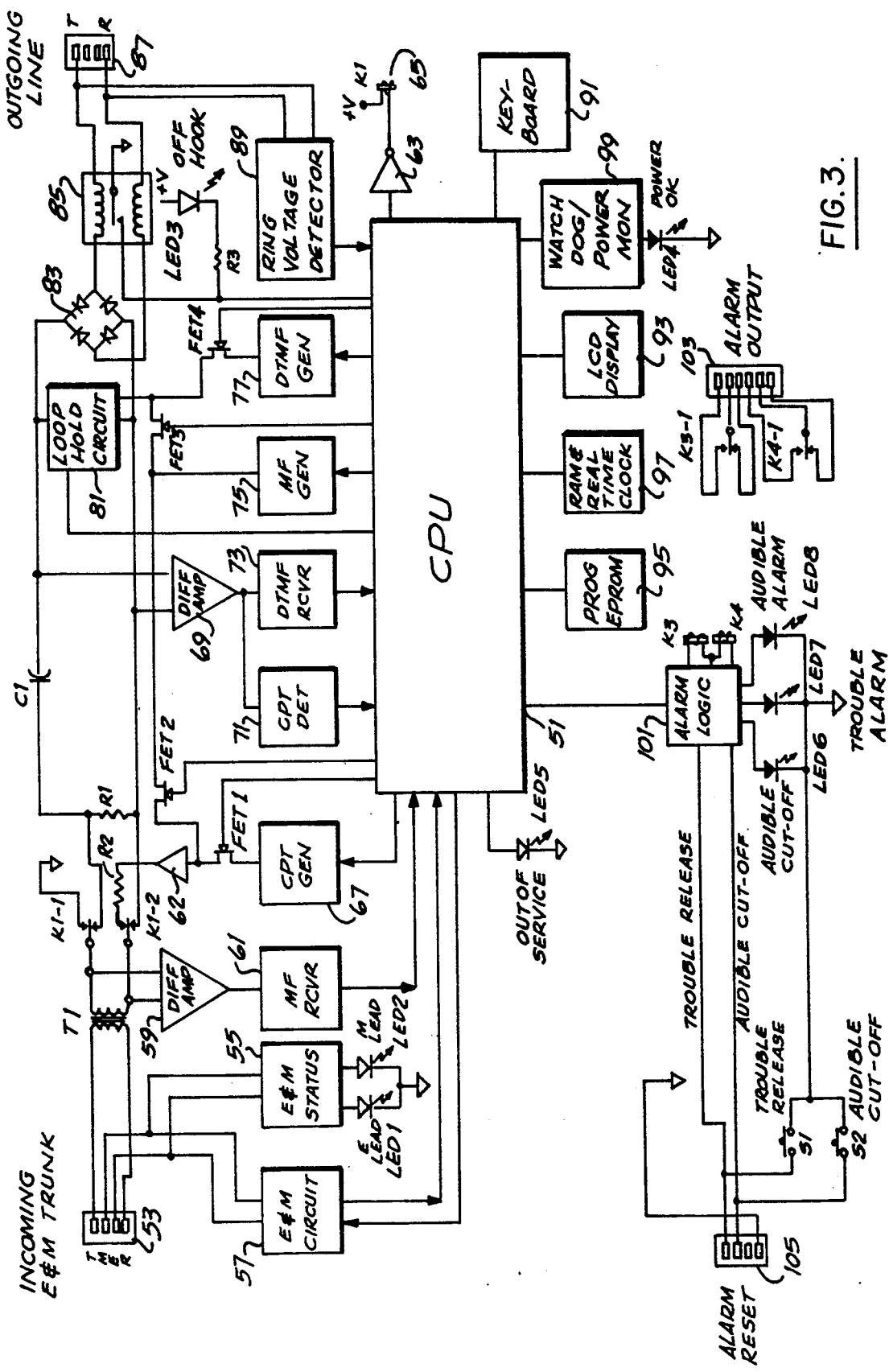
FIG. 3 is a block diagram of a trunk dial unit (TDU) suitable for use in the embodiment of the invention illustrated in FIG. 2.

FIG. 3 is a block diagram illustrating a TDU formed in accordance with the invention suitable for use in the embodiment of the invention illustrated in FIG. 2. The TDU illustrated in FIG. 3 includes: a central processing unit (CPU) 51 connected to control the operation of a plurality of subsystems and circuits in accordance with a program (FIGS. 5A and 5B) and data received from the subsystems and circuits. A suitable four-terminal connector 53 is provided to connect the TDU to the E & M trunk of the 9-1-1 central office 21. The tip (T) and ring (R) terminals of the four-terminal connector 53 are connected to opposite sides of the primary winding of a coupling transformer designated T1. The E and M terminals of the four-terminal connector 53 are connected to the input of an E & M status circuit 55 and to an E & M control circuit 57. The E & M status circuit 55 controls the emission of light by two light-emitting diodes designated LED1 and LED2 based on the presence or absence of signals on the E and M terminals. The E & M control circuit detects the presence of signals on the E and M terminals and applies the signals to the CPU in a form suitable for receipt by the CPU. The E & M circuit also receives control signals from the CPU and converts them into a suitable form and applies the control signals to the E and M terminals of the four-terminal connector 53.

The secondary winding of T1 is connected across the inputs of a first differential amplifier 59. The output of the first differential amplifier 59 is connected to the input of a multi-frequency (MF) receiver 61. The output of the MF receiver 61 is connected to the CPU 51. In a conventional manner, the MF receiver 61 decodes multi-frequency signals detected by the differential amplifier 59 and supplies the decoded signals to the CPU 51. The secondary winding of T1 is also connected to the common terminals of a pair of single-pole double-throw contacts designated K1-1 and K1-2. The state of the K1-1 and K1-2 contacts is controlled by whether or not a relay coil designated K1 and located on the right side of FIG. 3 is energized. The energization of K1 is controlled by the CPU via an inverting amplifier 63. The normally closed terminal of the K1-1 contacts is connected to ground. The normally open terminal of the K1-1 contacts is connected to one side of a first resistor designated R1. The normally closed terminal of the K1-2 contacts is connected through a second resistor, designated R2, and an amplifier 62 to the drain terminal of a field effect transistor switch designated FET1. The normally open terminal of the K1-2 contacts is connected to the other end of R1.

The gate of FET1 is connected to an output of the CPU 51 and the source terminal of FET1 is connected to the output of a call progress tone (CPT) generator 67. The CPT generator 67 is controlled by control signals produced by the CPU 51. When the K1 relay is not energized, in a conventional manner, when instructed to do so by the CPU, the CPT generator 67 applies tones to the common terminals of the K1-1 and K1-2 sets of contacts via the normally closed terminals. The tones are amplified by the amplifier 62. As a result, amplified CPT tones are applied to the tip and ring terminals of the four-terminal connector 53. The type of tones the CPT generator 67 is instructed to generate and when they are generated are described below in connection with the FIGS. 5-10 flow diagrams.

The normally open terminal of K1-1 is connected to one side of a capacitor designated C1. The other side of C1 is connected to one input of a second differential amplifier 69. The normally open terminal of K1-2 is connected to the second input of the second differential amplifier 69. The output of the second differential amplifier is connected to the input of a CPT detector 71 and to the input of a dual-tone multi-frequency (DTMF) receiver 73. The outputs of the CPT detector 71 and the DTMF receiver 73 are connected to the CPU 51. In operation, when the K1 relay is energized and, thus, the common terminals of the K1-1 and K1-2 contacts are connected to the normally open terminals of the K1-1 and K1-2 contacts, signals on the tip and ring lines from the 9-1-1 central office are applied to the second differential amplifier 69. The second differential amplifier 61 amplifies the difference between the signals and the difference is decoded by either the CPT detector or the DTMF receiver, depending upon the nature of the signal. More specifically, if the signals are call progress tones, the CPT detector decodes the signals and applies the decoded result to the CPU. Contrariwise, if the signals are DTMF signals, they are decoded by the DTMF receiver and the decoded result is applied to the CPU 51.

The TDU illustrated in FIG. 3 also includes a multi-frequency (MF) generator 75 and a dual-tone multi-frequency (DTMF) generator 77. Both the MF and the DTMF generators 75 and 77 are controlled by the CPU 51. FET1 and a second field effect transistor switch designated FET2 control the application of the tones produced by the MF and CPT generators to the normally closed terminal of the K1-2 contacts. More specifically, the drain terminal of FET2 is connected to the drain terminal of FET1. The gate terminal of FET2 is connected to the CPU 51. The source terminal of FET2 is connected to the output of the MF generator 75.

As will be readily appreciated from the foregoing description and viewing FIG. 3, the state of FET1 and FET2 control whether the output of the CPT generator 67 or the output of the MF generator 75 is applied to the normally closed terminal of the K1-2 contacts via the amplifier 62 and, thus, the tip and ring terminal of the four-terminal connector 53. More specifically, if FET1 is open and FET2 is closed, the output of the MF generator 75 is applied to the normally closed terminal of the K1-2 contacts. Contrariwise, if FET1 is closed and FET2 is open, the output of the CPT generator 67 is applied to the normally closed terminal of the K1-2 contacts.

The output of the MF generator is also connected to the source terminal of a third field effect transistor designated FET3. The output of the DTMF generator 77 is connected to the source terminal of a fourth field effect transistor designated FET4. The gate terminals of FET3 and FET4 are connected to outputs of the CPU 51. The drain terminals of FET3 and FET4 are connected together and to a loop hold circuit 81. As a result, if FET4 is open and FET3 is closed, the output of the MF generator 75 is applied to the loop hold circuit 81. Contrariwise, if FET3 is open and FET4 is closed, the output of the DTMF generator 77 is applied to the loop hold circuit 81.

The loop hold circuit 81 is connected in parallel with the input of the second differential amplifier 69. The loop hold circuit 81 is controlled by control signals produced by the CPU 51.

Connected in parallel with the loop hold circuit 81 is the output of a diode bridge 83. The input of the diode bridge 83 is connected to one end of the windings of a loop current detector 85. More specifically, one of the inputs of the bridge circuit 83 is connected to one end of one of the windings of the loop current detector 85 and the other input of the bridge 83 is connected to one end of the other winding of the loop current detector 85. The other ends of the loop current detector windings are connected to the tip (T) and ring (R) terminals of a second connector designated an outgoing LS line connector 87. One of the contacts of the loop current detector 85 is connected to ground and the other contact is connected both to the CPU 51 and through a third resistor designated R3 to the cathode of an off-hook LED designated LED3. The anode of LED3 is connected to a voltage source designated +V.

The tip (T) and ring (R) terminals of the outgoing LS line connector 87 are also connected to a ring voltage detector 89. The output of the ring voltage detector is connected to the CPU 51.

The CPU is also connected to: a keyboard 91; a clear liquid crystal display (LCD) 93; a program memory 95, preferably in the form of an erasable programmable read only memory (EPROM); and a temporary memory and real time clock 97. Preferably, the temporary memory is in the form of a random access memory (RAM). Also connected to the CPU is a watchdog/power monitor circuit 99. The output of the watchdog/power monitor circuit is connected to a power okay light-emitting diode designated LED4. More specifically, the anode of LED4 is connected to the output of the power monitor 99 and the cathode of LED4 is connected to ground.

An out-of-service light-emitting diode designated LED5 is also connected to the CPU. More specifically, the anode of LED5 is connected to the CPU and the cathode of LED5 is connected to ground.

Finally, the CPU is connected to an alarm logic circuit 101. The alarm logic circuit 101 controls the emission of light by three light-emitting diode indicators, an audible cut-off indicator, a trouble alarm indicator, and an audible alarm indicator, designated LED6, LED7, and LED8, respectively. The anodes of LED6, LED7 and LED8 are all connected to outputs of the alarm logic circuit 101. The cathodes of LED6, LED7, and LED8 are all connected to ground. The alarm logic circuit 101 also controls the energization of a pair of relay coils designated K3 and K4. K3 and K4, respectively, control the state of sets of single pole, double-throw relay contacts designated K3-1 and K4-1. The K3-1 and K4-1 contacts are connected to the terminals of a six-terminal alarm output connector 103. More specifically, one of the terminals of the alarm output connector 103 is connected to the common terminal of the K3-1 contacts. Another terminal is connected to the normally open terminal of the K3-1 contacts. A further terminal is connected to the normally closed terminal of the K3-1 contacts. One of the other terminals of the alarm output connector 103 is connected to the common terminal of the K4-1 contacts. The normally open terminal of the K4-1 contacts is connected to another terminal of the alarm output connector 103 and the normally closed terminal of the K4-1 contacts is connected to the last terminal of the alarm output connector 103. As a result, the release of the K3 and K4 relay coils controls the creation of jumpers across the K3-1 and K4-1 related contacts of the alarm output connector 103. This control, in turn, is used to control the actuation of external alarms (not shown), such as audible indicators.

Resetting of the alarm logic 101 and the external alarms is controlled by a pair of momentary contact switches designated S1 and S2. S1 is designated a trouble release switch and S2 is designated an audible cut-off switch. Alarm logic 101 is connected to a pair of terminals of a four-terminal alarm reset connector 105. S1 is connected between one of these alarm reset connector terminals and ground, and S2 is connected between the other terminal and ground. One of the other terminals of the alarm reset connector 105 is connected to ground. Closure of the S1 switch causes the alarm logic 101 to de-energize the K3 and K4 relays to release audible alarms as well as causes the alarms to be reset via the alarm reset connector. Closure of S2 creates an audible cut-off without releasing the trouble alarm. Since audible alarms controllable by the signals created by the alarm logic in the manner heretofore described are well known, they are not described here.

As will be readily appreciated from the foregoing description, the TDU illustrated in FIG. 3 is central office versatile due to its ability to transmit and receive information in both dual-tone multi-frequency (DTMF) and multifrequency (MF) form. It also has the capability to communicate with a central office via the E&M circuit. The TDU also has the ability to detect and produce call progress tones via the CPT generator 67 and the CPT detector 71. Finally, the TDU can provide local and, if desired, remote alarms when a malfunction occurs. All of these functions are controlled by the CPU, preferably in the manner illustrated in FIGS. 5A and 5B and described below.

Figure 4:
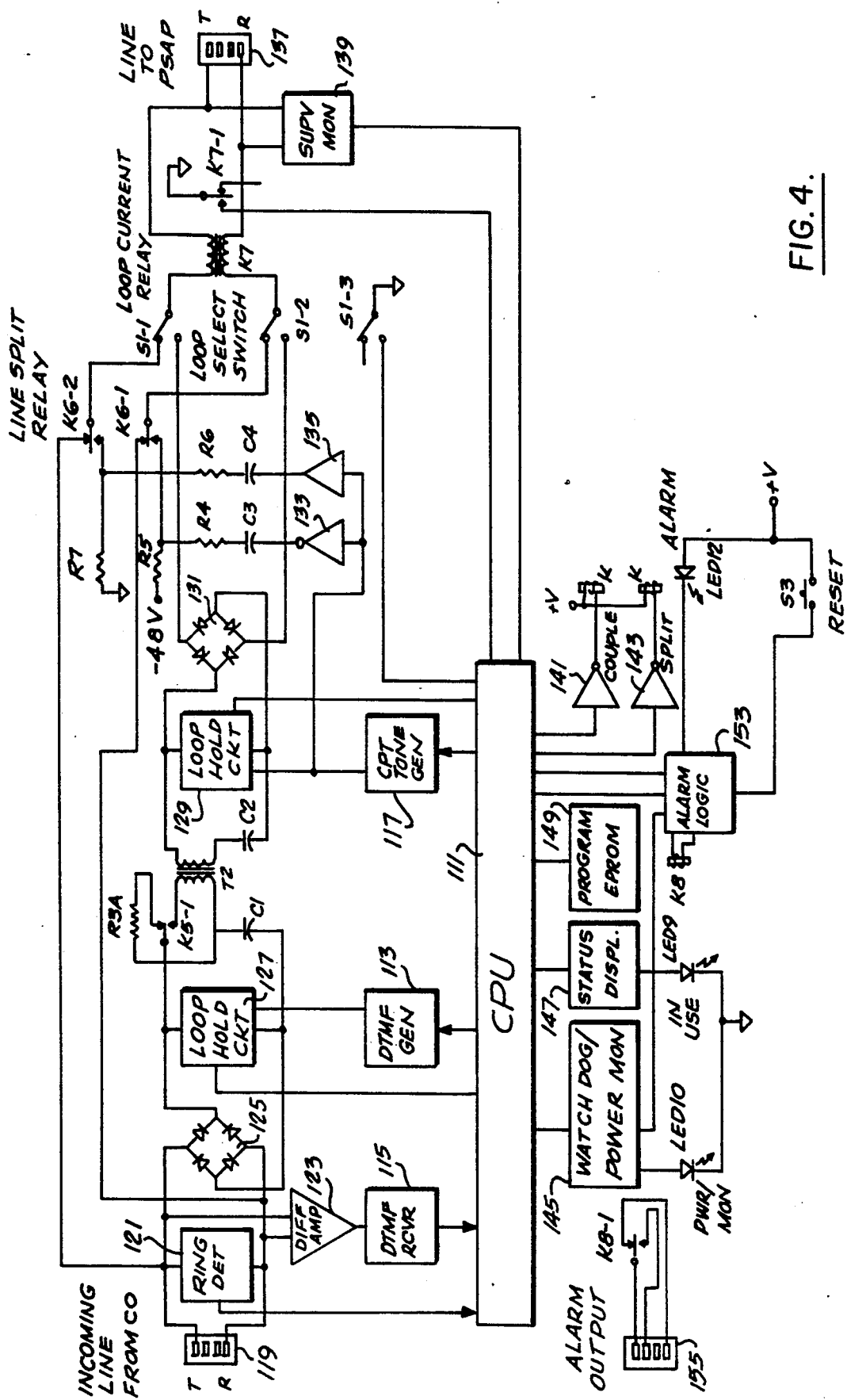
FIG. 4 is a block diagram of a call access unit (CAU) suitable for use in the embodiment of the invention illustrated in FIG. 2.

FIG. 4 is a partially block and partially schematic diagram illustrating a CAU formed in accordance with the invention. Like the TDU (FIG. 3), the CAU includes a central processing unit 111. Because the CAU is "captive" to a TDU, i.e., the CAU is only required to communicate with the TDU, and because the CAU is only required to communicate with DTMF PSAPs, only one form of communication is used by the CAU.

As a result, the CAU includes only a DTMF generator 113 and a DTMF receiver 115; it does not include an MF generator and an MF receiver. The CAU does include a CPT tone generator 117 so that it can produce call progress tones. A CPT receiver is not included because, as will be understood from the following discussion of the CAU program illustrated in FIG. 11, the CAU is not required to respond to call progress tones.

The incoming line (not shown) from the PSAP central office is connected to a four-terminal incoming line connector 119. Since only tip (T) and ring (R) wires are used, only two terminals of the connector are used. A ring detector 121 that bridges the tip and ring terminals of the incoming line connector 119 is connected to the CPU 111. The tip and ring terminals are also connected to the input of a differential amplifier 123. The output of the differential amplifier 123 is connected to the input of the DTMF receiver 115. The tip and ring terminals of the incoming line connector 119 are also connected to the input of a first diode bridge 125. A first loop hold circuit 127 is connected across the output of the first diode bridge 125. The first loop hold circuit 127 is controlled by the CPU 111 and receives signals produced by the DTMF generator 113, which is also controlled by the CPU 111. One of the output terminals of the first diode bridge 125 is also connected to the common terminal of a set of single pole, double-throw relay contacts designated K5-1. The normally closed terminal of the K5-1 contacts is connected through an AC termination resistor, designated R3A, to one side of the primary winding of a transformer designated T2. The normally open terminal of the K5-1 contacts is connected to the other side of the primary winding of T2. The other output terminal of the diode bridge 125 is connected through a capacitor designated C1 to the side of the primary winding of T2 connected to the normally closed terminal of the K5-1 contacts.

One side of the secondary winding of T2 is connected to one of the output terminals of a second loop hold circuit 129. A capacitor designated C2 connects the other side of the secondary winding of T2 to the other output terminal of the second loop hold circuit 129. The second loop hold circuit is also controlled by the CPU 111. The signal input of the second loop hold circuit is connected to the output of the CPT tone generator 117, which is also controlled by the CPU. The output of a second diode bridge 131 is connected across the output of the second loop hold circuit 129.

The output of the CPT tone generator 117 is also connected to the inputs of an inverting amplifier 133 and a noninverting amplifier 135. The output of the inverting amplifier 133 is connected through a series circuit formed by a capacitor designated C3 and two resistors designated R4 and R5 to a voltage source designated −48 V. The junction between R4 and R5 is also connected to the normally open terminal of a set of single-pole, double-throw relay contacts designated K6-1. The normally closed terminal of the K6-1 contacts is connected to the ring terminal of the incoming line connector 119. The output of the noninverting amplifier 135 is connected through a series circuit formed by a capacitor designated C4 and a pair of resistors designated R6 and R7 to ground. The junction between R6 and R7 is connected to the normally open terminal of a set of relay contacts designated K6-2. The normally closed terminal of the K6-2 contacts is connected to the tip terminal of the incoming line connector 119.

The CAU illustrated in FIG. 4 also includes a loop select switch that includes three sets of single-pole, double-throw contacts ganged together and designated S1-1, S1-2, and S1-3. The upper remote terminal of the S1-1 contacts is connected to the common terminal of the K6-2 contacts. The upper remote terminal of the S1-2 contacts is connected to the common terminal of the K6-1 contacts. The lower remote terminal of the S1-1 contacts is connected to one input terminal of the second diode bridge 131 and the lower remote terminal of the S1-2 contacts is connected to the other input terminal of the second diode bridge 131. The upper remote terminal of the S1-3 contacts is unconnected and the lower remote terminal of the S1-3 contacts is connected to the CPU 111. The common terminal of the S1-1 contacts is connected to one end of one of the windings of a loop current relay designated K7. The common terminal of the S1-2 contacts is connected to one end of the other winding of K7. The common terminal of the S1-3 contacts is connected to ground. The other end of the S1-1 connected winding of K7 is connected to the tip terminal of an output line connector 137, designated a line-to-PSAP connector, and to one input of a supervisory monitor 139. The other end of the S1-2 connected winding of K7 is connected to the ring terminal of the output line connector 137 and to the other input of the supervisory monitor 139. The output of the supervisory monitor 139 is connected to the CPU 111. The common terminal of the loop current relay contacts, designated K7-1, is connected to ground. The normally closed terminal of the K7-1 contacts is unconnected and the normally open terminal of the K7-1 contacts is connected to the CPU 111.

The CAU, illustrated in FIG. 4, also includes a pair of inverting amplifiers 141 and 143 that connect the CPU 111 to the relay coils, designated K5 and K6, that control relay contacts K5-1, K6-1, and K6-2. More specifically, the outputs of the inverting amplifiers 141 and 143 are each connected to one end of one of the relay coils. The other ends of the relay coils are connected to a voltage source designated +V.

The CPU 111 is also connected to a watchdog/power monitor circuit 145, a status display 147, and a program memory 149. Preferably, the program memory 149 is in the form of an erasable programmable read only memory (EPROM). The program memory stores the code that controls the operation of the CPU 111, preferably in the manner illustrated in FIG. 11 and described below. Although not shown, the CAU also includes a transistor memory preferably in the form of a RAM for storing status information and TDU instructions as required by the program illustrated in FIG. 11 and described below.

The status display 147 controls the emission of light by an IN-USE light-emitting diode, designated LED9 in accordance with instructions received from the CPU. More specifically, the anode of LED9 is connected to the output of the display circuit 147, and the cathode of LED9 is connected to ground. The watchdog/power monitor circuit 145 monitors the power applied to the CPU 111 and controls the emission of light by PWR/MON light-emitting diode designated LED10. More specifically, the anode of LED10 is connected to the output of the watchdog/power monitor circuit 145 and the cathode of LED10 is connected to ground.

The CPU also controls an alarm logic circuit 153 that, in turn, controls the emission of light by an audible alarm light-emitting diode, designated LED12. More specifically, the cathode of LED12 is connected to the output of the alarm logic circuit 153 and the anode of LED12 is connected to a voltage source designated +V.

The alarm logic circuit 153 also controls the energization of an alarm relay coil designated K8. K8 controls the status of a set of single-pole, double-throw relay contacts designated K8-1, which is connected to the terminals of a four-terminal alarm output connector 155. The alarm output connector is connected to remote alarms (not shown). More specifically, one of the terminals of the alarm output connector is connected to the common terminal of the K8-1 contacts. The normally open terminal of the K8-1 contacts is connected to another terminal of the alarm output connector 155. The normally closed terminal of the K8-1 contacts is connected to still another terminal of the alarm output connector 155.

The CAU also includes a momentary contact switch designated S3. S3 is an alarm reset switch. One terminal of S3 is connected to +V. The other terminal of S3 is connected to the alarm logic 153. When actuated, S3 resets the CAU alarm logic circuit and the CAU remote alarm.

As will be readily appreciated by those skilled in the art from the foregoing description, the CAU has the capability of connecting the incoming line from the PSAP central office to the PSAP in either of two ways. When the line split relay contacts, i.e. the K6-1 and K6-2 contacts, are in their normal position and S1-1 and S2-2 are in their upper position, which is the position illustrated in FIG. 4, the tip and ring terminals of incoming line connector 119 are connected to the tip and ring terminals of the outgoing line connector 137. DTMF signals can be sent to the PSAP central office.

When K6 is energized, the CPT tones are sent via coupling circuits formed by the inverting and noninverting amplifiers 133 and 135 and their related resistive and capacitive components, and the S1-1 and S2-2 switch contacts. When the S1-1, S1-2, and S1-3 switch contacts are in their alternate positions, CPT tone generator signals can be sent to the PSAP via the second diode bridge 131.

In the event of failure, the CPU controls the alarm logic such that local and remote alarms are created to alert an operator of failure of the CAU. The alarms are reset by actuation of S3.

In order to avoid undue complexity, the TDU program flow diagram (FIGS. 5A and 5B) and the various TDU subroutine programs (FIGS. 6A–10B) do not illustrate the specific relays and/or tone generators controlled by the TDU (FIG. 3) program in order to accomplish various functions. Rather, only the desired functions are illustrated and hereinafter described.

The first step in the TDU program illustrated in FIG. 5 is power-up initialization of the TDU CPU 51. After power-up initialization has been completed, a self-diagnosis step is performed to determine if the TDU 31 is operating correctly. If the TDU 31 is not operating correctly, an alarm flag is set. After the self-diagnostics step has been performed, a test is made to determine if any new alarm condition exists. This is accomplished by reading the alarm flag that was set during the self-diagnostic subroutine if an incorrect operating condition is detected and any alarm flags created by the PSAP and CAU failures described below. If a new alarm condition is found, i.e., a new alarm flag has been set, the alarm logic circuit 101 is enabled to set the audible and/or visual alarms illustrated in FIG. 3 and described above.

Next, a busy signal is applied to the incoming trunk by the CPT generator, i.e., the trunk 24 connecting the TDU 31 to the 9-1-1 central office 21. If no new alarm conditions are found or after a busy signal has been applied to the TDU incoming trunk 24, a test is made to determine if all alarm conditions have been cleared. Again, this is accomplished by testing the alarm flags set (and cleared) during the pass through the self-diagnostics step. If all alarm flags are clear, any alarms that were previously set are cleared by the alarm logic 101 and the TDU incoming trunm 24 is released, i.e., the busy signal is removed. After the TDU incoming trunk is released, or if all alarm flags were clear, a test is made to determine if an operator is requesting that the user program mode be entered, i.e., if the TDU is to be programmed. If the TDU is to be programmed, a busy signal is applied to the TDU incoming trunk 24. Thereafter, the user programming is carried out. This is accomplished by the user via the keyboard 91 in a conventional manner that may include menu displays created on the clear LCD display 93. Then a test is made to determine if the user has instructed that the user program mode be left. If such an instruction has not occurred, additional user programming is carried out.

After the user instructs that the user program mode is to be left, or if the user program mode was not entered, a test (FIG. 5B) is made to determine if the TDU is in a maintenance mode. If the TDU is in a maintenance mode, all maintenance functions are checked. This involves executing user-requested tests, i.e., tests requested by a user via the keyboard 91, designed to determine if the TDU is operating correctly. Preferably, the tests are menu-driven, i.e., create menu displays that respond to keyboard inputs by a user.

Figure 5A:
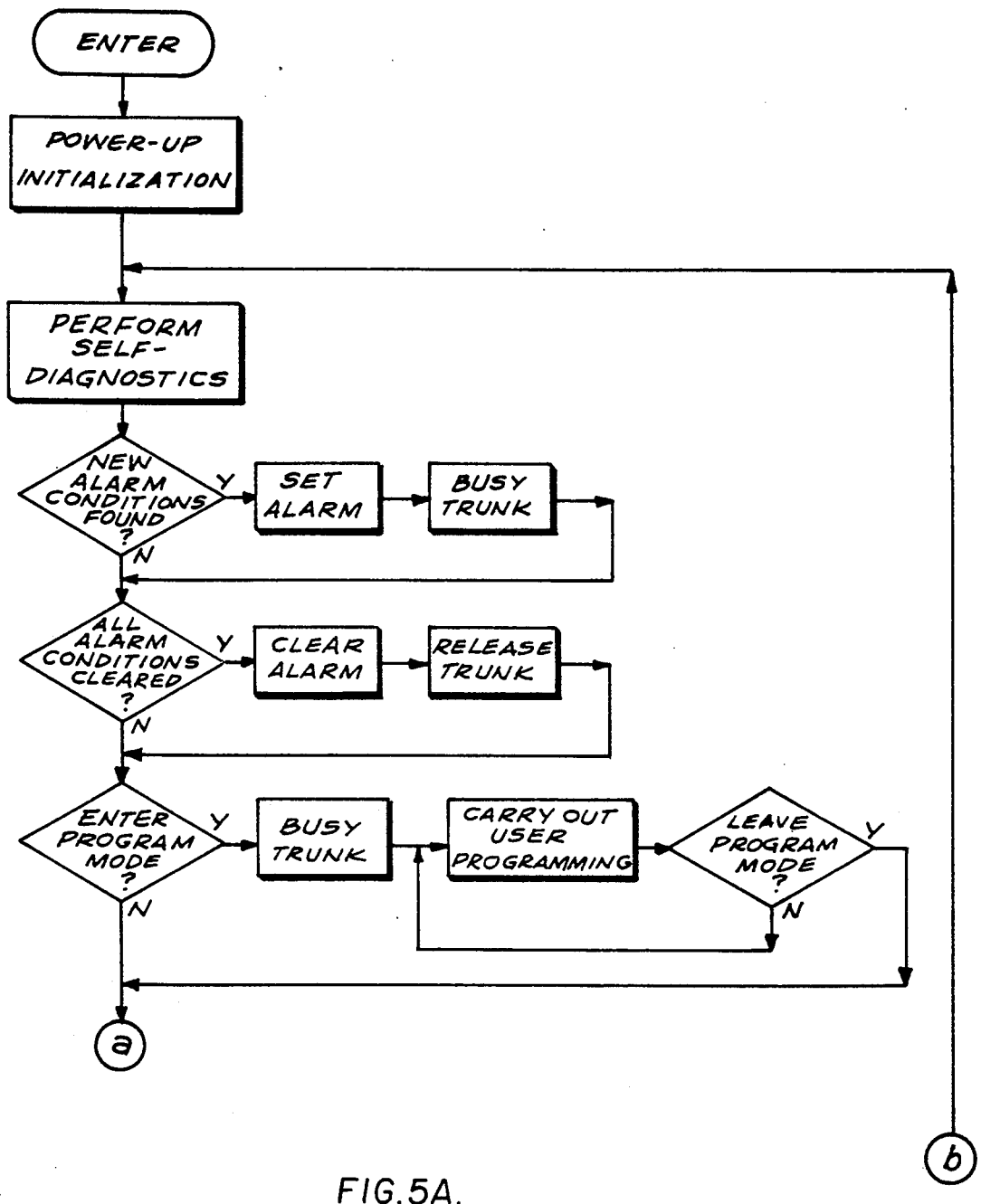
FIGS. 5A and 5B comprise a flow diagram illustrating a program formed in accordance with the invention for controlling the operation of the TDU illustrated in FIG. 3.

After the maintenance functions have been checked or if the maintenance mode is not enabled, a test is made to determine if the TDU is in an alarm mode. If the TDU is not in an alarm mode, a test is made to determine if there is an incoming call from the 9-1-1 central office. If there is an incoming call, a pass is made through the call procedure subroutine illustrated in FIG. 6 and described below. After the call procedure subroutine has been completed, the program cycles to the self-diagnostics step (FIG. 5A). If the TDU is in an alarm mode or if there is no incoming call, a test is made to determine if any CAU or PSAP fail flags have been set. If any CAU or PSAP fail flags have been set, a test is made to determine if a recovery timer has timed out. If the recovery timer has timed out, a pass is made through the recovery procedure subroutine illustrated in FIG. 8 and described below. After the recovery procedure subroutine has been completed, the program cycles to the self-diagnostics step (FIG. 5A). Similarly, if the recovery timer has timed out, the program cycles to the self-diagnostics step.

If no CAU or PSAP fail flags have been set, a test is made to determine if a test timer has timed out. If the test timer has timed out, a pass is made through the test call procedure subroutine illustrated in FIG. 10 and described below. After the test call procedure subroutine has been completed, or if the test timer has not timed out, the program cycles to the self-diagnostics step. In essence, the test timer/test call procedure path results in test calls being placed to CAUs at regular intervals. The recovery call procedure results in a test occurring after the test call procedure, during a previous pass through the TDU program, has detected a CAU or TDU failure.

Figure 5B:
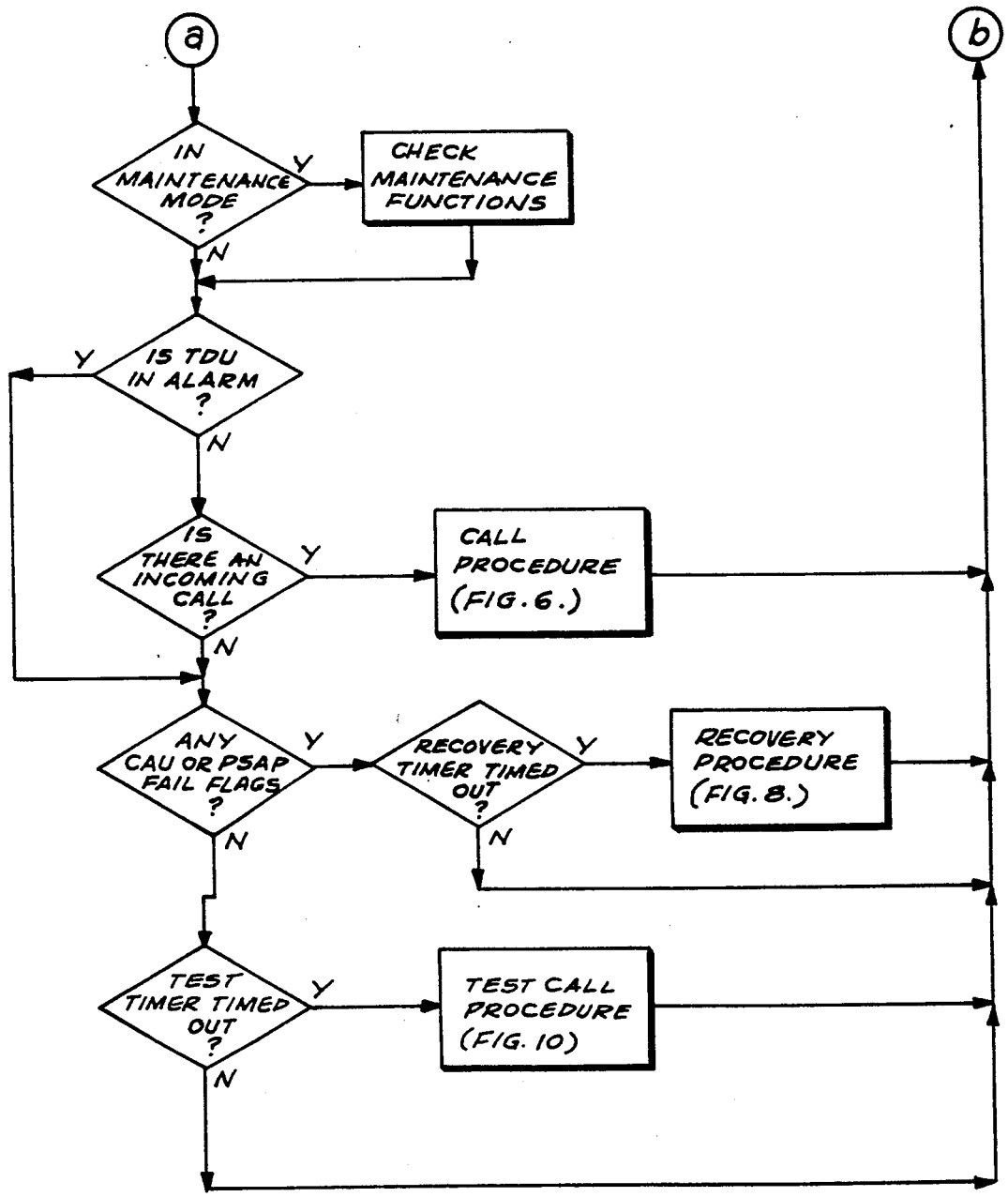

As illustrated in FIG. 5B and described above, when an incoming call is received from a 9-1-1 caller, the call procedure subroutine is entered. The first step in the call procedure subroutine (FIG. 6A) is to seize the incoming trunk, i.e., seize the trunk 24 connecting the TDU to the 9-1-1 central office 21. Thereafter, the automatic number identification (ANI) information that is automatically generated by the 9-1-1 central office upon receipt of a 9-1-1 call is received and stored by the TDU. This is accomplished by the CPU controlling the operation of the E&M circuit (FIG. 3). Next, the CPU causes the TDU outgoing line to go off-hook. This is accomplished by the actuation of the loop hold circuit 81. Next, a test is made to determine if loop current has been detected. This is accomplished by testing the state of the contacts of the loop current detector 85. If loop current is not detected, which indicates the presence of a fault, as shown on the left side of FIG. 6A, the alarm logic 101 is enabled to create an audible/visual alarm. In addition, an alarm flag is set. After the alarm is enabled and the alarm flag is set, the incoming trunk is busied out by the TDU. Then, the caller is sent a reorder message in the form of a fast busy signal. This is created by the seizure of the central office E lead by the TDU. As will be appreciated by those skilled in the telephone art, lack of loop current detection is an indication of a problem with the outgoing line from the TDU. Seizure of the E lead by the TDU prevents the 9-1-1 central office from attempting to recall the TDU when the 9-1-1 caller hangs up and redials in response to the fast busy signal. As a result, a recall by the 9-1-1 caller is rerouted by the 9-1-1 central office.

Figure 6A:
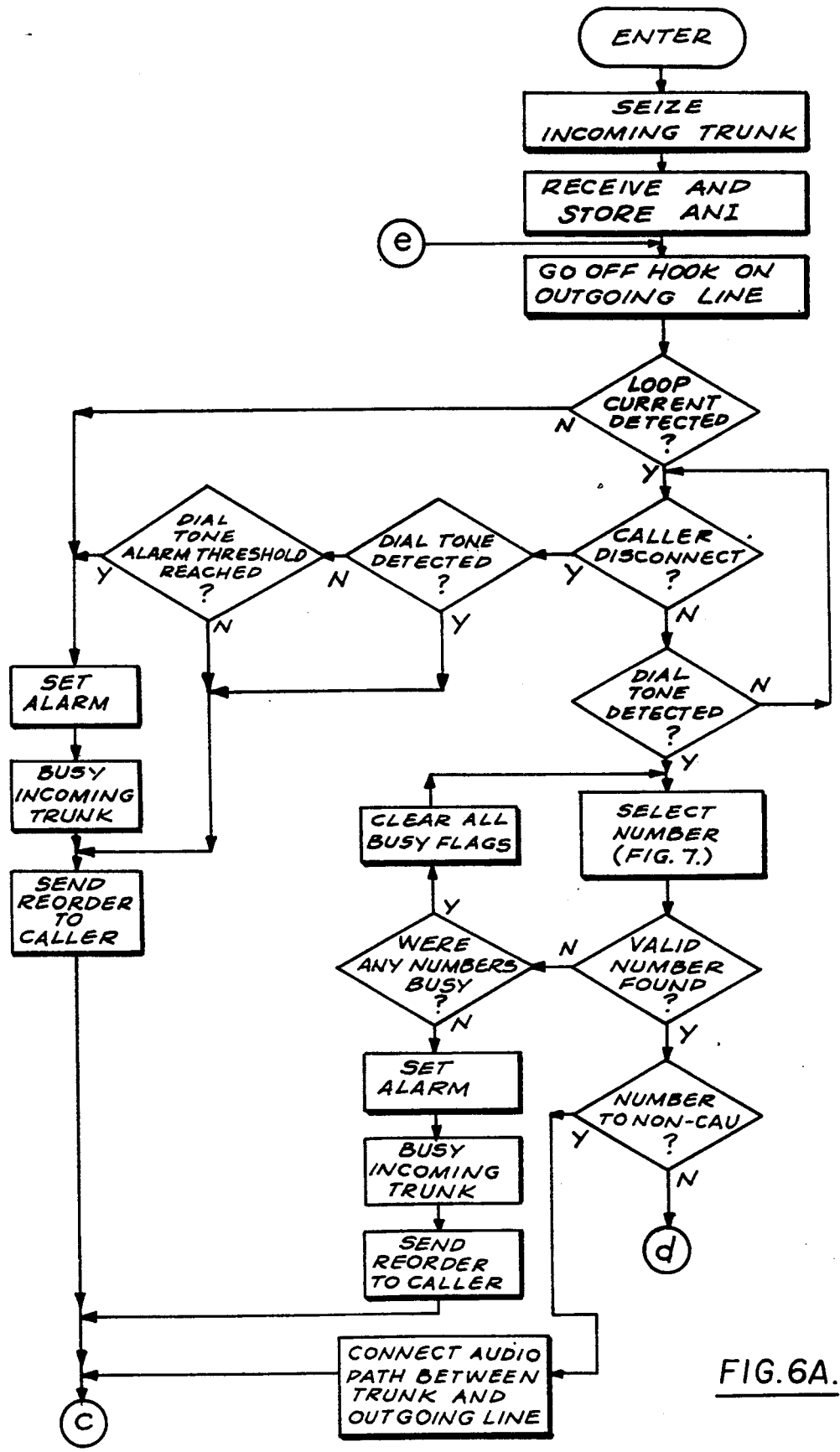
FIGS. 6A, 6B, and 6C comprise a flow diagram illustrating a call procedure subroutine suitable for use in the TDU program illustrated in FIGS. 5A and 5B.
Figure 6B:
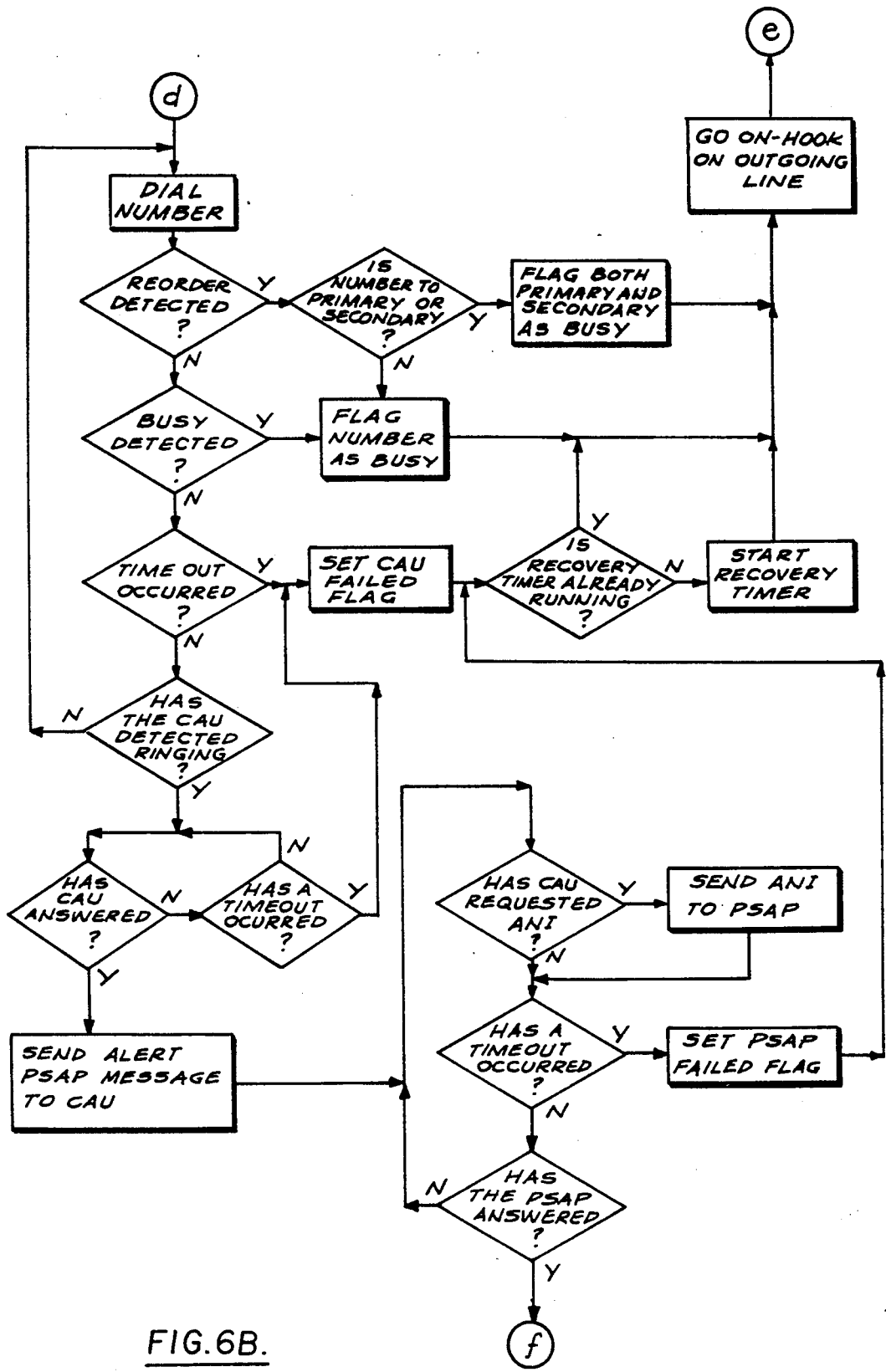
Figure 6C:
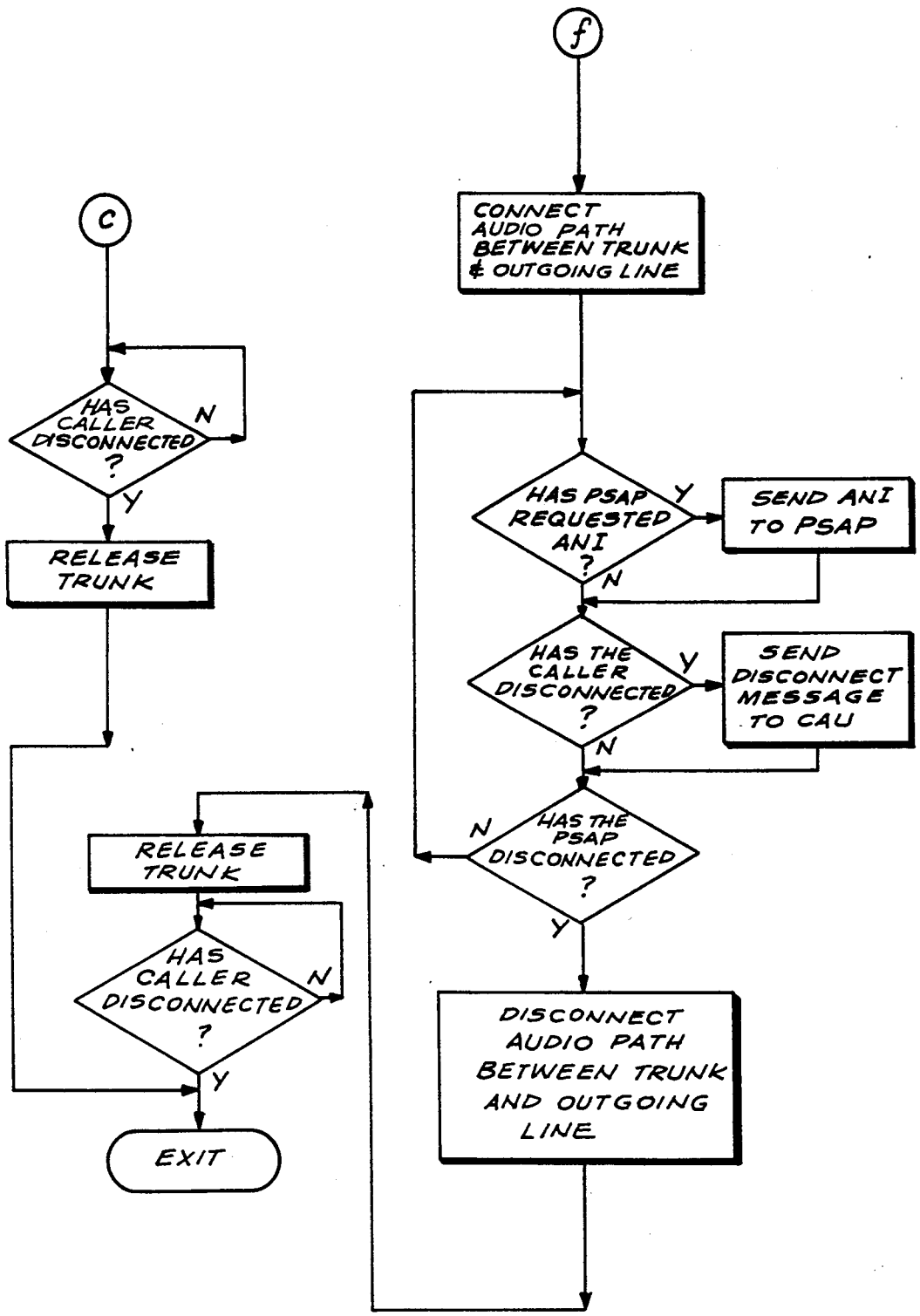

Next, as shown in FIG. 6C, a test is made to determine if the caller has disconnected. The program remains in a caller-disconnect loop until the caller disconnects. Thereafter, the TDU releases the TDU incoming trunk and the call procedure subroutine ends.

Returning to FIG. 6A, if loop current is detected after the TDU has caused the outgoing line to go off-hook, a test is made to determine if the caller has disconnected. If the caller has disconnected, a test is made to determine if dial tone is present on the trunk connecting the TDU to the central office. If dial tone is not detected, a test is made to determine if a dial tone alarm threshold has been reached, i.e., if the dial tone has been absent for a predetermined period of time. If the dial tone alarm threshold has been reached, the alarm logic is enabled to create an audible/visual alarm and an alarm flag is set. Then a busy signal is applied to the incoming trunk, i.e., the trunk connecting the TDU 31 to the 9-1-1 central office 21. Thereafter, the incoming trunk E lead is seized by the TDU 31 and a reorder message in the form of a fast busy signal is sent to the calling telephone. Then, the program cycles to the "Has call disconnected?" test (FIG. 6C).

If dial tone is detected, or if the dial tone alarm threshold has not been reached, the set alarm and busy incoming trunk steps are bypassed and the program cycles to the seize lead and send reorder message step, followed by the "Has caller disconnected?" test.

As shown on the right side of FIG. 6A, if the caller has not disconnected, a test is made to determine if dial tone is present on the outgoing line. This is accomplished by the CPU 51 causing the loop hold circuit 81 to go "off hook" and the CPU testing the output of the CPT detector 71, which, as noted above, is connected to the outgoing line via the diode bridge 83. If the dial tone is not present on the outgoing line, a test is again made to determine if the caller has disconnected. If the caller has disconnected, the dial tone present test is repeated. The program continues in this loop until dial tone is detected on the outgoing line. When dial tone is detected, a pass is made through the select number subroutine illustrated in FIG. 7 and described below. After the pass through the select number subroutine, a test is made to determine if a valid number was found by the pass through the select number subroutine. If no valid number has been found, a test is made to determine if any numbers were busy. If numbers were busy, busy flags associated with the busy numbers are cleared and another pass is made through the select number subroutine. If no numbers were busy, the alarm logic is enabled to create an audible/visual alarm and an alarm flag is set. Thereafter, a busy signal is applied to the incoming trunk. Then the E lead of the incoming trunk is seized. Thereafter, a reorder (fast busy) message is sent to the caller. After the reorder message is sent, as shown in FIG. 6C, the program cycles to the "Has caller disconnected?" step.

If a valid number is located during a pass through the select number subroutine, a test is made to determine if the number is the number of a non-CAU. If the number is not a CAU number, the number is dialed and the audio path between the incoming trunk and the outgoing line is connected. This is accomplished by energizing the K1 relay coil. Thereafter, the program cycles to the "Has Caller Disconnected?" step.

Turning to FIG. 6B, if the number is a CAU number, it is dialed. Then a test is made to determine if the result of the dialing is the receipt of a reorder message, i.e., if a fast busy message is being generated by the 9-1-1 central office 21. As noted above, a fast busy (i.e., reorder) message indicates that all of the central office outgoing trunks are busy. If a reorder message is detected, a test is made to determine if the number dialed was a primary or secondary PSAP number. If the number was a primary or secondary PSAP number, both the primary and secondary PSAP number flags are set, which indicates that all of the central office's outgoing trunks are busy. As will be better understood from the following discussion of FIG. 7, this causes the 9-1-1 central office to call a local PSAP. After the primary and secondary PSAP flags are set to a busy state, the TDU goes on-hook on the outgoing line and returns to the "Go Off-hook on Outgoing Line" step illustrated in FIG. 6A and described above. If the number was not a primary or secondary PSAP number, a flag related to the number that was dialed is set, to indicate that the number was busy. Thereafter, the TDU goes on-hook on the outgoing line and recycles to the "Go Off-hook on Outgoing Line" step in FIG. 6A.

If a reorder message is not detected, the dialed number is tested to determine if it is busy. If the dialed number is busy, the number is flagged as busy and the TDU outgoing line is returned to an on-hook state. Thereafter, the program cycles to the "Go-hook on Outgoing Line" step in the call procedure illustrated in FIG. 6A and described above.

If the dialed number is not busy, a time-out timer is tested to determine if a predetermined period of time has elapsed since the number was originally dialed. If the time out timer has timed out, a flag associated with the CAU whose number was dialed is set to indicate a failed condition. Thereafter, a test is made to determine if a recovery timer is running. If the recovery timer is running, the outgoing line of the TDU is returned to an on-hook state and the program cycles to the "Go Off-hook on Outgoing Line" step in the call procedure (FIG. 6A). If the recovery timer is not running, the recovery timer is started. After the recovery timer is started, the outgoing line of the TDU is placed on-hook and the program cycles to the "Go Off-hook on Outgoing Line" step of the call procedure.

If the time-out timer has not timed out, a test is made to determine if the CAU has detected ringing. This test is accomplished by the CPU of the TDU testing the output of the CPT detector 71 to determine if the PSAP central office is generating a ring-back tone. If a ring-back tone is not detected, the call procedure cycles back to the point where the chosen CAU number is dialed. If the CPT detects a ring-back tone, a test is made to determine if the CAU has answered the call. If the CAU has not answered the call, a test is made to determine if a time out has occurred, i.e., if a predetermined period of time has elapsed since the number was dialed. If the predetermined period of time has not elapsed, the call answer test is repeated. The call procedure remains in this loop until either the CAU answers the call or the time-out period elapses. If the time-out period elapses before the CAU answers the call, the program proceeds to the set CAU failed flag step.

If the call is answered before the time-out period elapses, an alert PSAP message is sent to the CAU. Thereafter, a test is made to determine if the CAU has requested automatic number identification (ANI) information. If the CAU has requested ANI, the ANI information captured by the TDU when the 9-1-1 call was received is sent to the PSAP. After the ANI information has been sent or if the CAU has not requested ANI information, a test is made to determine if a time out has occurred, i.e., a predetermined period of time has elapsed since the alert PSAP message was sent to the CAU. If the time-out period has elapsed, a PSAP failed flag is set. Thereafter, the program cycles to the point where a test is made to determine if a recovery timer is running. If the time-out period has not elapsed, a test is made to determine if a PSAP-answered message has been sent to the TDU by the CAU. If the PSAP-answered message has not been received, the program cycles to the point where a test was made to determine if the CAU has requested ANI. If a PSAP-answered message has been received, the audio path between the trunk and the outgoing line is connected, i.e., the K1 coil (FIG. 3) is energized to change the position of the K1-1 and K2-2 contacts.

As illustrated in FIG. 6C, after the audio path between the trunk and the outgoing line has been connected, a test is made to determine if the PSAP has requested ANI. If the PSAP has requested ANI, ANI is sent to the PSAP. After ANI has been sent to the PSAP or if the PSAP is not requesting ANI, a test is made to determine if the 9-1-1 caller has disconnected. If the 9-1-1 caller has disconnected, a disconnect message is sent to the CAU. After the disconnect message has been sent to the CAU or if the 9-1-1 caller has not disconnected, a test is made to determine if the PSAP has disconnected. If the PSAP has not disconnected, the call procedure cycles to the point where the PSAP requested ANI test is performed. If the PSAP has disconnected, the audio path between the 9-1-1 central office trunk and the TDU outgoing line is disconnected. Thereafter, the TDU releases the trunk. After the trunk is released, a test is made to determine if the caller has disconnected. The call procedure continues this test until the caller disconnects. After the caller disconnects, the program exits the call procedure subroutine.

Figure 7:
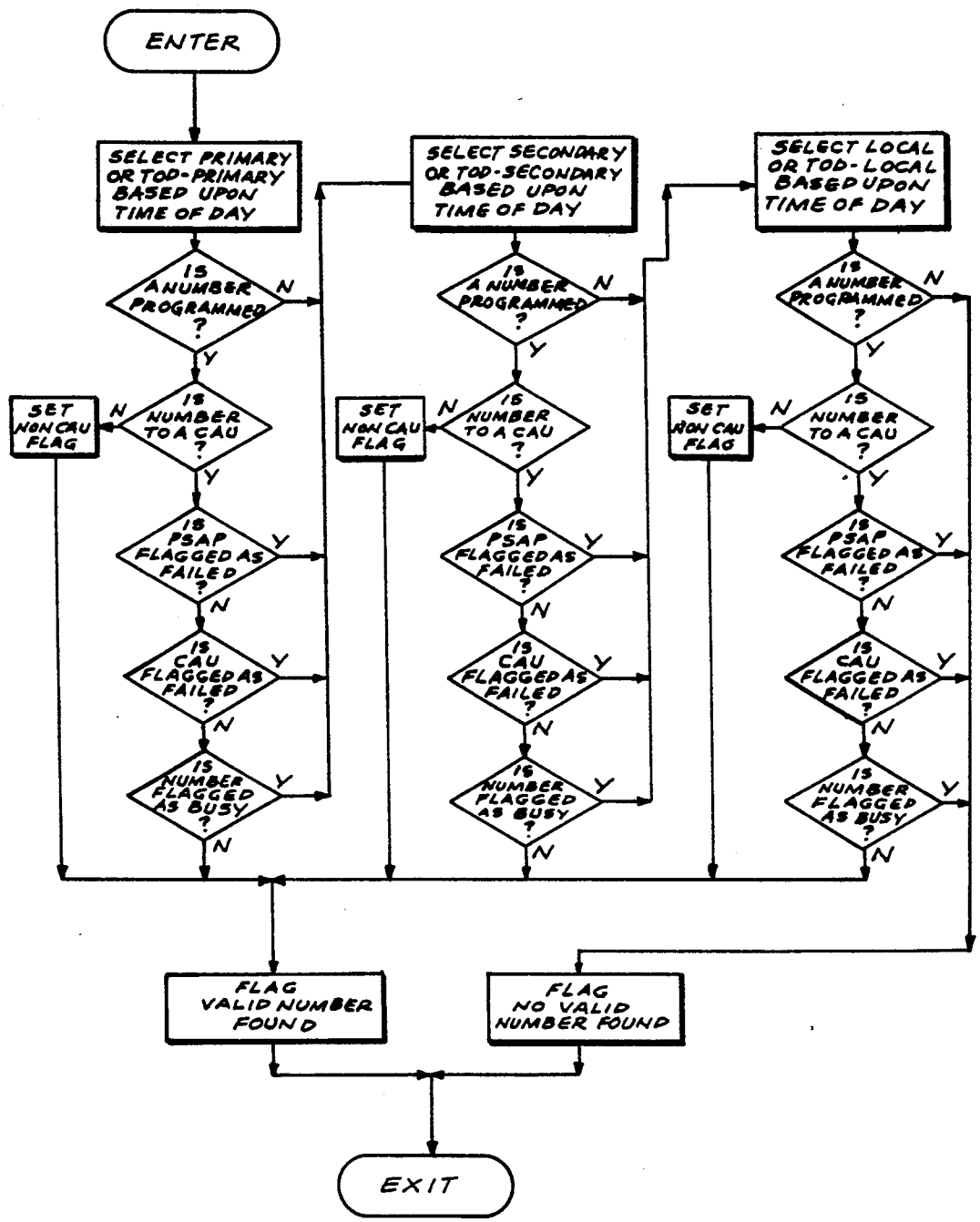
FIG. 7 is a flow diagram illustrating a select number subroutine suitable for use in the call procedure and other subroutines.

As shown in FIG. 7, the first step of the select number subroutine is to select either the primary or a time-of-day (TOD) primary number to be dialed when dialing occurs. More specifically, during user programming (FIG. 5A), a user has the option to have different primary, secondary and/or local CAUs called depending upon the time of day. During one part of the day, e.g., 8:00 a.m. to 5:00 p.m., one set of primary, secondary and local (if all are desired) CAUs are called. During other parts of the day, e.g., 5:00 p.m. to 8:00 a.m. of the next day, a second set of primary, secondary and local CAUs are called. If the TOD option has been chosen, the first step of the select number subroutine is to select the primary number to be called, based on the time of day. If the TOD option has not been selected, the single programmed primary number is selected. Next, a test is made to determine if a primary number or a TOD primary number, as the case may be, has actually been programmed into the TDU. If a primary or TOD primary number has been programmed, a test is made to determine if the number is a CAU number. If the number is not a CAU number, a non-CAU flag is set. Then a valid number found flag is set. Thereafter, the program exits the select number subroutine.

If the selected number is not a CAU number, a test is made to determine if the PSAP associated with the number has been flagged as failed. If the PSAP associated with the number is not flagged as failed, a test is made to determine if the CAU associated with the number is flagged as failed. If the CAU associated with the number is not flagged as failed, a test is made to determine if the number is flagged as busy. If the number is not flagged as busy, the valid number found flag is set, and the program exits the select number subroutine.

If a primary or TOD primary number has not been programmed into the memory of the TDU, or if the associated PSAP is flagged as failed, the associated CAU is flagged as failed or the number is flagged as busy, the select number program decides that a secondary or TOD secondary number should be dialed when dailing occurs. Then, a test is made to determine if a secondary or TOD secondary number has actually been programmed into the TDU. If a secondary or TOD secondary has been programmed, a test is made to determine if the selected number is a CAU number. If the selected number is not a CAU number, the non-CAU flag is set and the program cycles to the point where the valid number found flag is set. If the number is a CAU number, a test is made to determine if the PSAP associated with the selected number is flagged as failed. If the PSAP associated with the selected number is not flagged as failed, a test is made to determine if the CAU associated with the selected number is flagged as failed. If the CAU associated with the selected number is not flagged as failed, a test is made to determine if the number is flagged as busy. If the number is not flagged as busy, the select number subroutine cycles to the point where the valid number found flag is set.

If a secondary or TOD secondary number has not been programmed into the system, or if the associated PSAP is flagged as failed, the associated CAU is flagged as failed or the number is flagged as busy, the select number subroutine decides that a local or a TOD local number should be dialed when dialing occurs.

Then, as illustrated on the right side of FIG. 7, a test is made to determine if a local or a TOD local number has actually been programmed into the TDU. If a local or a TOD local number has been programmed, a test is made to determine if the selected number is a CAU number. If the selected number is not a CAU number, the non-CAU flag is set and the program cycles to the point where the valid number found flag is set. If the number is a CAU number, a test is made to determine if the PSAP associated with the selected number is flagged as failed. If the PSAP associated with the selected number is not flagged as failed, a test is made to determine if the CAU associated with the selected number is flagged as failed. If the CAU associated with the selected number is not flagged as failed, a test is made to determine if the selected number is flagged as busy. If the selected number is not flagged as busy, the valid number found flag is set.

If the local or TOD local number is not programmed into the TDU memory, or if the PSAP associated with the number is flagged as failed, the CAU associated with the number is flagged as failed or the number is flagged as busy, a no valid number found flag is set. Thereafter, the program exits the select number subroutine.

Figure 8:
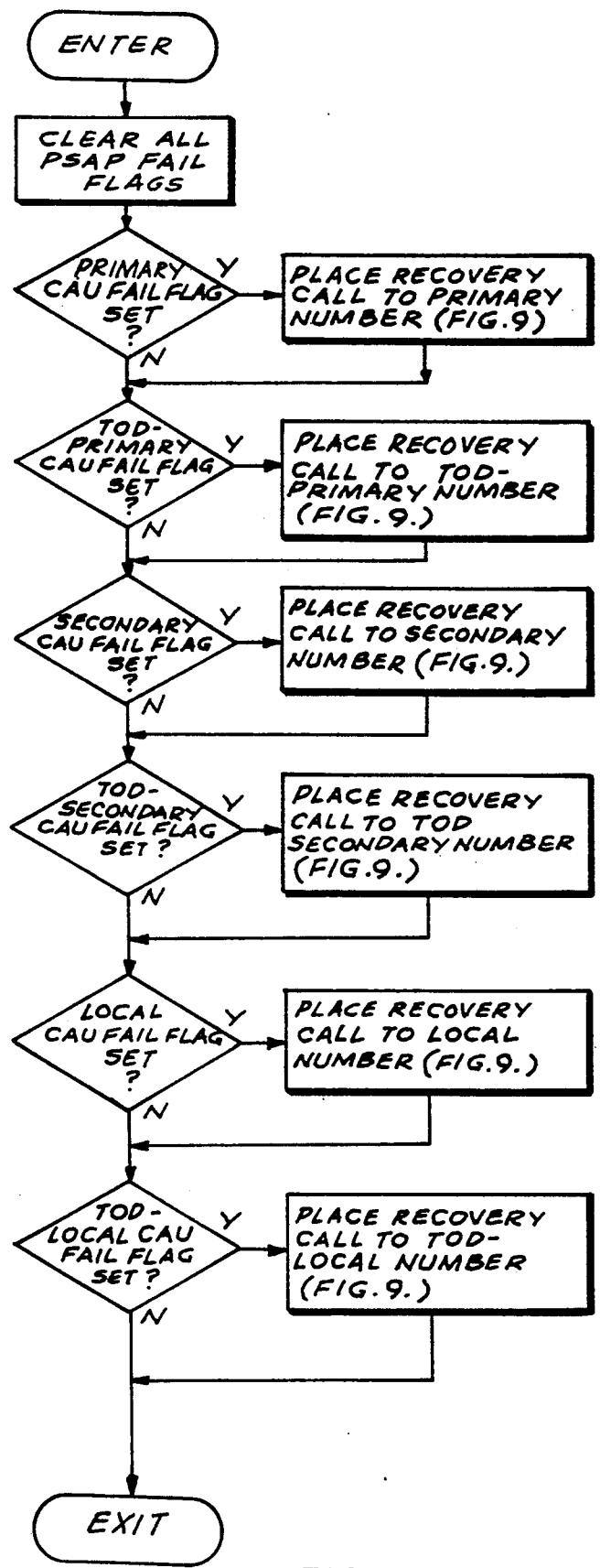
FIG. 8 is a flow diagram of a recovery procedure subroutine suitable for use in the TDU program illustrated in FIGS. 5A and 5B.
Figure 9A:
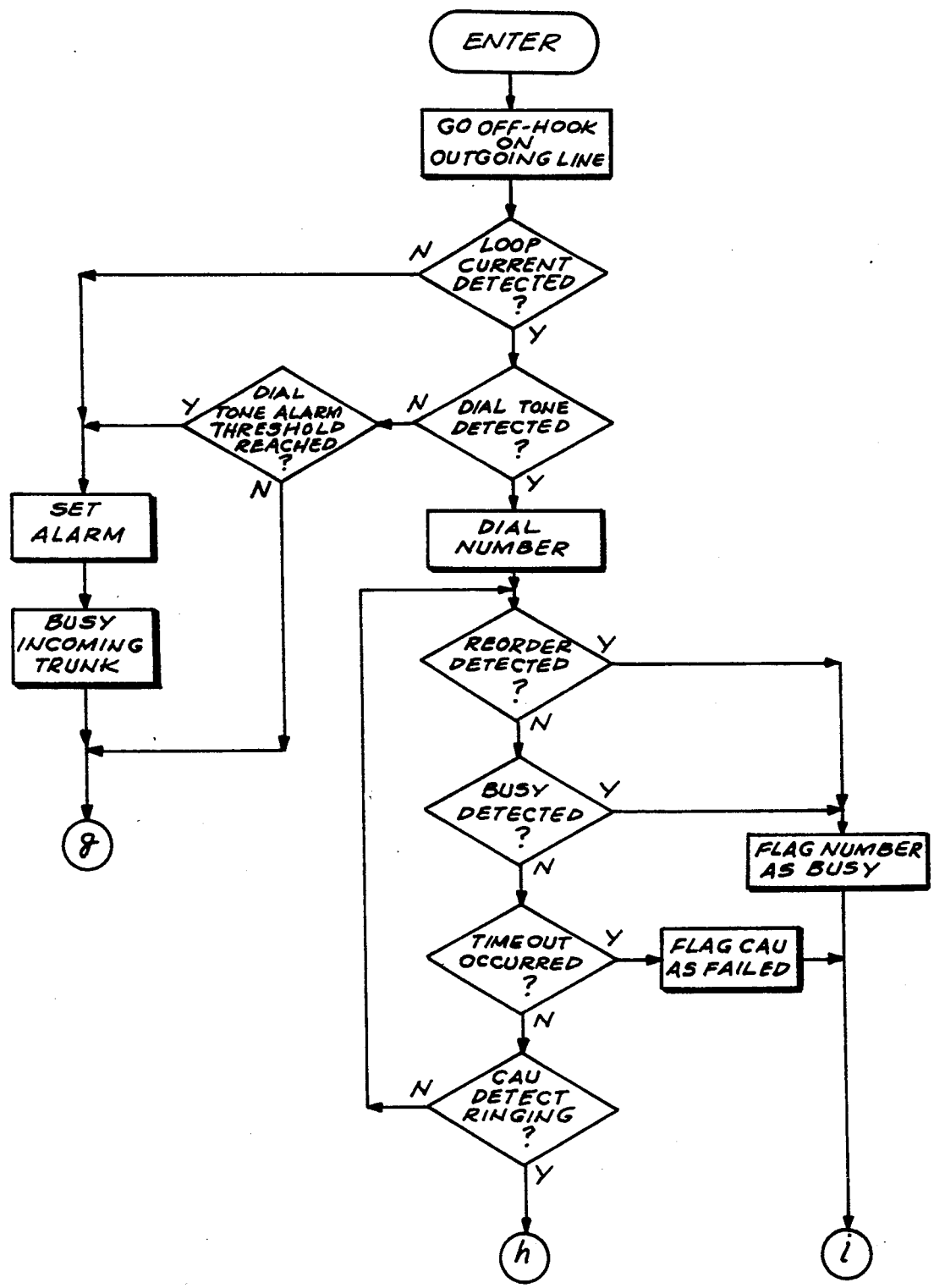
FIGS. 9A and 9B comprise a flow diagram of a place recovery call subroutine suitable for use in the recovery procedure subroutine illustrated in FIG. 8.
Figure 9B:
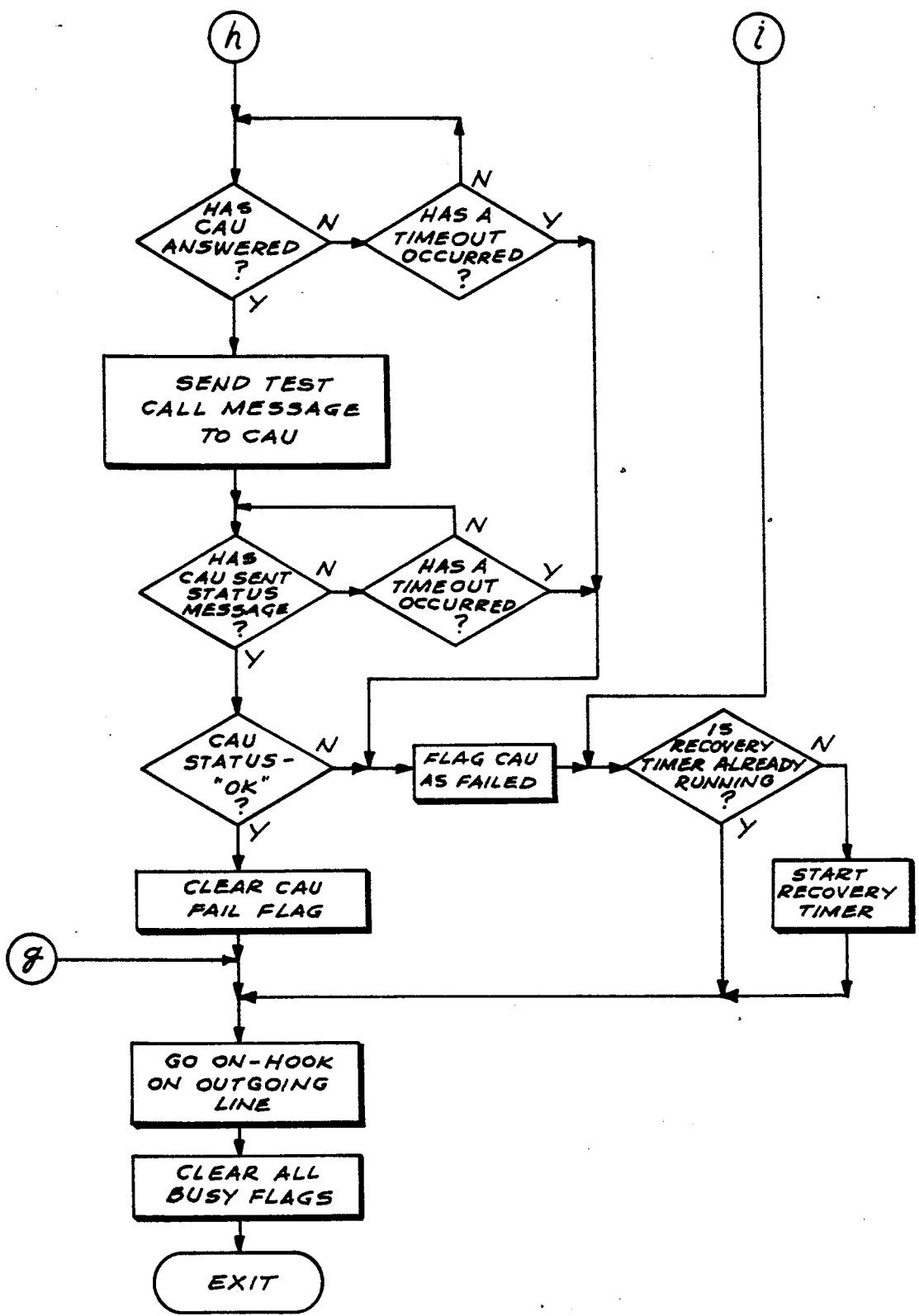

FIG. 8 illustrates a recovery procedure subroutine suitable for use in the TDU program illustrated in FIGS. 5A and 5B. The first step in the recovery procedure subroutine is to clear all PSAP fail flags. Thereafter, a test is made to determine if the primary CAU fail flag is set. If the primary CAU fail flag is set, a recovery call is placed to the primary number. This is accomplished by making a pass through a recovery call subroutine. A subroutine suitable for placing a recovery call is illustrated in FIGS. 9A and 9B and described below. If the primary CAU fail flag is not set or after a pass has been made through the recovery call subroutine, a test is made to determine if the time-of-day (TOD) primary CAU fail flag is set. If the TOD primary CAU fail flag is set, a recovery call is placed to the TOD primary number by making a pass through the recovery call subroutine illustrated in FIGS. 9A and 9B. If the TOD primary CAU fail flag is not set or after a pass has been made through the recovery call subroutine, a test is made to determine if the secondary CAU fail flag is set. If the secondary CAU fail flag is set, a secondary number recovery call is placed by making a pass through the recovery call subroutine illustrated in FIGS. 9A and 9B. If the secondary CAU fail flag is not set or after a pass has been made through the recovery call subroutine, a test is made to determine if the TOD secondary CAU fail flag is set. If the TOD secondary CAU fail flag is set, a TOD secondary number recovery call is placed by making a pass through the recovery call subroutine. If the TOD secondary CAU fail flag is not set or after a pass has been made through the recovery call subroutine, a test is made to determine if the local CAU fail flag is set. If the local CAU fail flag is set, a local number recovery call is placed by making a pass through the recovery call subroutine. If the local CAU fail flag is not set, or after a pass has been made through the recovery call subroutine, a test is made to determine if the TOD local CAU fail flag is set. If the TOD local CAU fail flag is set, a TOD local number recovery call is placed by making a pass through the recovery call subroutine illustrated in FIGS. 9A and 9B. The program exits the recovery procedure subroutine if the TOD local CAU flag is not set or after a pass has been made through the recovery call subroutine.

FIGS. 9A and 9B illustrate a recovery call subroutine suitable for use in the recovery procedure subroutine illustrated in FIG. 8 and described above. The first step in the recovery call subroutine is for the TDU to go off-hook on the outgoing line. This is accomplished by the CPU 51 enabling the hold circuit 81. Next, a test is made to determine if loop current has been detected by the loop current detector 85 in the manner heretofore described. If loop current is not detected, the alarm logic is enabled to create an audible/visual alarm and an alarm flag is set. In addition, a busy signal is applied to the incoming trunk from the 9-1-1 central office by the CPT generator 67. Thereafter, the CPU 51 causes the outgoing line to go on-hook. Next, all CAU and PSAP busy flags are cleared.

As illustrated in FIG. 9A, if loop current is detected, a test is made to determine if dial tone has been detected by the CPT detector 71. If dial tone has not been detected, a test is made to determine if a dial tone alarm threshold has been reached, i.e., if a predetermined period of time has elapsed since the dial tone detected test first occurred. If the dial tone alarm threshold has not been reached, the program cycles to the point in FIG. 9B where the outgoing line is placed on-hook. If the dial tone threshold has been reached, the alarm logic is enabled and an alarm flag is set, a busy signal is applied to the incoming trunk, the outgoing line is placed on-hook and all PSAP and CAU busy flags are cleared. If dial tone is detected, the appropriate number is dialed. As noted above, this could be a primary CAU number, a TOD CAU number, a secondary CAU number, a secondary TOD CAU number, a local CAU number, or a local TOD CAU number.

After the number has been dialed, a test is made to determine if a reorder message (i.e., a fast busy signal) is present on the outgoing line, which, as noted above, indicates that all of the 9-1-1 central office outgoing trunks are busy. If reorder has been detected, the dialed number is flagged as busy. Thereafter, as shown on the right side of FIG. 9B, a test is made to determine if a recovery timer is or is not running. If the recovery timer is not running, it is started. After the recovery timer has been started or if the recovery timer is not running, the program cycles to a point where the outgoing line is placed on-hook.

If a reorder message is not detected, as shown in FIG. 9A, a test is made to determine if the dialed number is busy. If the dialed number is busy, the number is flagged as busy. Thereafter, the program cycles to the point where the recovery timer is tested.

If the dialed number is not busy, a test is made to determine if a time-out has occurred, i.e., if a predetermined period of time has elapsed since the number was dialed. If a time-out has occurred, the CAU associated with the dialed number is flagged as failed. Thereafter, the program cycles to the point where the recovery timer test is performed. If a time-out has not occurred, a test is made to determine if the CAU has detected ringing. This, like the reorder and busy tests, is accomplished by the CPU 51 testing the output of the CPT detector 71. In the case of ringing, the CPU tests the output of the CPT detector to determine if the CPT detector is detecting a ring-back tone. If a ring-back tone is not being detected, the program cycles to the point where the reorder message detected test is performed.

If the CAU detects ringing, as shown in FIG. 9B, a test is made to determine if the CAU has answered. If the CAU has not answered, a test is made to determine if a time-out has occurred, i.e., if a predetermined period of time has elapsed since the "Has CAU Answered?" test was first performed. if a time-out has not occurred, the "Has CAU Answered?" test is repeated. If a time-out has occurred, a failed flag associated with the called CAU is set. Then, the program cycles to the "Is Recovery Timer Already Running?" test.

If the CAU answers before the time-out occurs, a test call message is sent to the CAU. Thereafter, a test is made to determine if a CAU status message has been received. If the CAU status message has not been received, a test is made to determine if a time-out has occurred, i.e., a predetermined time has elapsed since the CAU status message received test was first performed. If a time-out has not occurred, the CAU status message received test is repeated. If a time-out has occurred, a failure flag associated with the CAU that was called is set. Thereafter, the "Is Recovery Timer Already Running?" test is performed. If the CAU has sent a status message, a test is made to determine if the CAU status is okay. If the CAU status is not okay, the CAU fail flag is set and the program cycles to the point where the "Is Recovery Timer Already Running?" test is performed. If the CAU status is okay, the CAU failed flag is cleared (if set). Thereafter, the program cycles to the point where the outgoing line is placed on-hook. Then, as illustrated in FIG. 9B and described above, all busy flags are cleared and the program exits the recovery call subroutine.

Figure 10A:
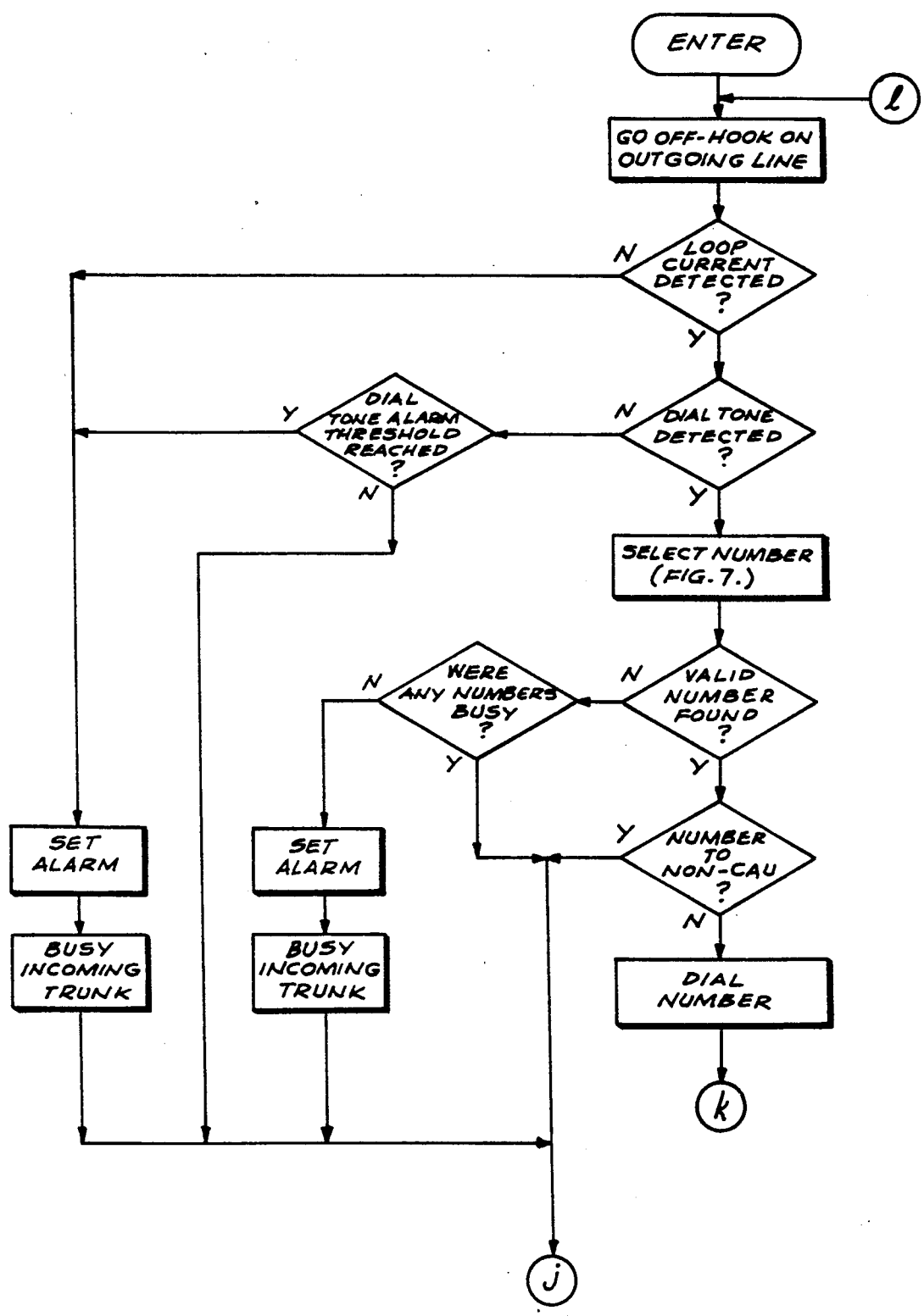
FIGS. 10A and 10B comprise a flow diagram of a test call procedure subroutine suitable for use in the TDU program illustrated in FIGS. 5A and 5B.
Figure 10B:
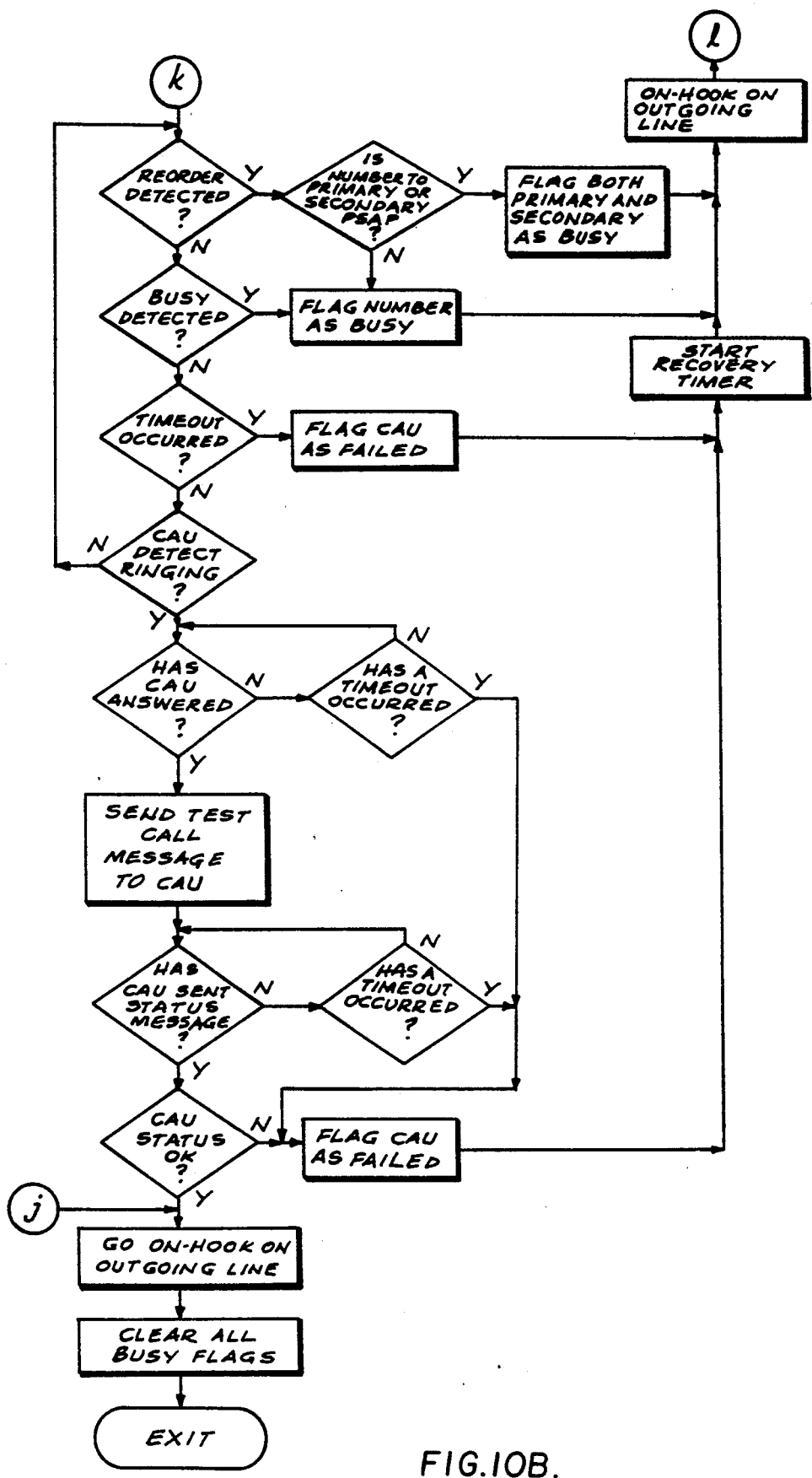

FIG. 10A illustrates a test call procedure suitable for use in the TDU program illustrated in FIGS. 5A and 5B. The first step in the test call procedure is for the TDU to go off-hook on its outgoing line. Thereafter, a test is made to determine if loop current has been detected by the loop current detector 85. If loop current has not been detected, the alarm logic is enabled to create an audible/visual alarm and an alarm flag is set. Then, a busy signal is applied to the incoming trunk. Thereafter, as shown in FIG. 10B, the TDU goes on-hook on the outgoing line and all PSAP and CAU busy flags are cleared.

Returning to FIG. 10A, if loop current is detected, a test is made to determine if dial tone is present on the TDU outgoing line. If dial tone is not present, i.e., cannot be detected by the CPT detector 71, a test is made to determine if a dial tone alarm threshold has been reached, i.e., if dial tone has not been detected for a predetermined period of time. If the dial tone alarm threshold has not been reached, the outgoing line of the TDU is placed on-hook and all PSAP and CAU busy flags are cleared. If the dial tone alarm threshold has been reached, the alarm logic is enabled, an alarm flag is set and a busy signal is applied to the incoming trunk before the outgoing line of the TDU goes off-hook. If dial tone is detected, a pass is made through the select number subroutine illustrated in FIG. 7 and described above. Thereafter, a test is made to determine if a valid number has been found. If no valid numbers were found, a test is made to determine if all of the numbers dialed were busy. If all of the numbers dialed were busy, the alarm logic is enabled, an alarm flag is set, and a busy signal is applied to the incoming trunk of the TDU. Thereafter, the outgoing trunk of the TDU goes on-hook and all PSAP and CAU busy flags are cleared. If all numbers were busy, the TDU outgoing line is placed on-hook without the alarm logic being enabled, the alarm flag being set and a busy signal being applied to the incoming line.

If a valid number was found during the pass through the select number subroutine, a test is made to determine if the number is the number of a non-CAU. If the number is the number of a non-CAU, the outgoing line of the TDU is placed on-hook and all PSAP and CAU busy flags are cleared before the program exits the test call procedure.

If the number is a non-CAU number, the number is dialed. Thereafter, as illustrated in FIG. 10B, a test is made to determine if a reorder message is present on the TDU outgoing line. As noted above, a reorder message, i.e., a fast busy signal, indicates that all of the outgoing trunks of the 9-1-1 central office 21 are in use. If a reorder message is detected, a test is made to determine if the number dialed was a primary or a secondary PSAP number. If the dialed number was a primary or secondary PSAP number, both primary and secondary number busy flags are set, because all of the 9-1-1 central office outgoing trunks are in use. Thereafter, the outgoing line of the TDU goes on-hook and the test call procedure cycles to the point where the outgoing line of the TDU goes off-hook. If the number dialed was not a primary or secondary PSAP number, the number dialed is flagged as busy. Thereafter, after the outgoing line of the TDU goes on-hook, the test call procedure subroutine cycles to the point where the outgoing line goes off-hook.

If a reorder message is not detected, a test is made to determine if the number dialed was busy. If the number dialed was busy, the number is flagged as busy and program cycles to the point where the outgoing line goes on-hook and, then, to the point where the outgoing line goes off-hook.

If the dialed number is not busy, a test is made to determine if a time-out timer that was set when the number was dialed has timed out. If a time-out has occurred, the CAU called is flagged as failed. Thereafter, a recovery timer is started. After the recovery timer is started, the outgoing line of the TDU is placed on-hook prior to another pass through the test call procedure subroutine.

If a time-out has not occurred, a test is made to determine if the CAU has detected ringing. This is accomplished by testing the CPT detector to see if it is detecting a ring-back tone. If the CAU has not detected ringing, the test call procedure cycles to the point where the reorder message test is performed. If the CAU has detected ringing, a test is made to determine if the CAU has answered. If the CAU has not answered, a test is made to determine if a time-out has occurred, i.e., a predetermined period of time has elapsed since the "Has CAU Answered?" test first took place. If a time-out has not occurred, the "Has CAU Answered?" test is repeated. If a time-out has occurred, the called CAU is flagged as failed. Thereafter, the recovery timer is started followed by the outgoing line of the TDU being placed on-hook and the program recycling to the beginning of the test call procedure subroutine.

If the CAU answers prior to the end of the time-out period, a test call message is sent to the CAU. Thereafter, a test is made to determine if the CAU has sent a status message. If the CAU has not sent a status message, a test is made to determine if a time-out has occurred, i.e., if a predetermined period of time has elapsed since the "Has CAU Sent Status Message?" test first occurred. If a time-out has not occurred, the "Has CAU Sent Status Message?" test is repeated. If a time-out has occurred, the CAU is flagged as failed. Thereafter, the recovery timer is started and the outgoing line of the TDU is placed on-hook, followed by another pass through the test call procedure subroutine.

If the CAU has sent a status message, a test is made to determine if the CAU status is okay. If the CAU status is not okay, the CAU is flagged as failed. Thereafter, the recovery timer is started and the outgoing line of the TDU is placed on-hook, followed by another pass through the test call procedure. If the CAU status is okay, the outgoing line of the TDU is placed on-hook followed by all of the CAU and PSAP busy flags being cleared. Thereafter, the program exits the test call procedure subroutine.

Figure 11:
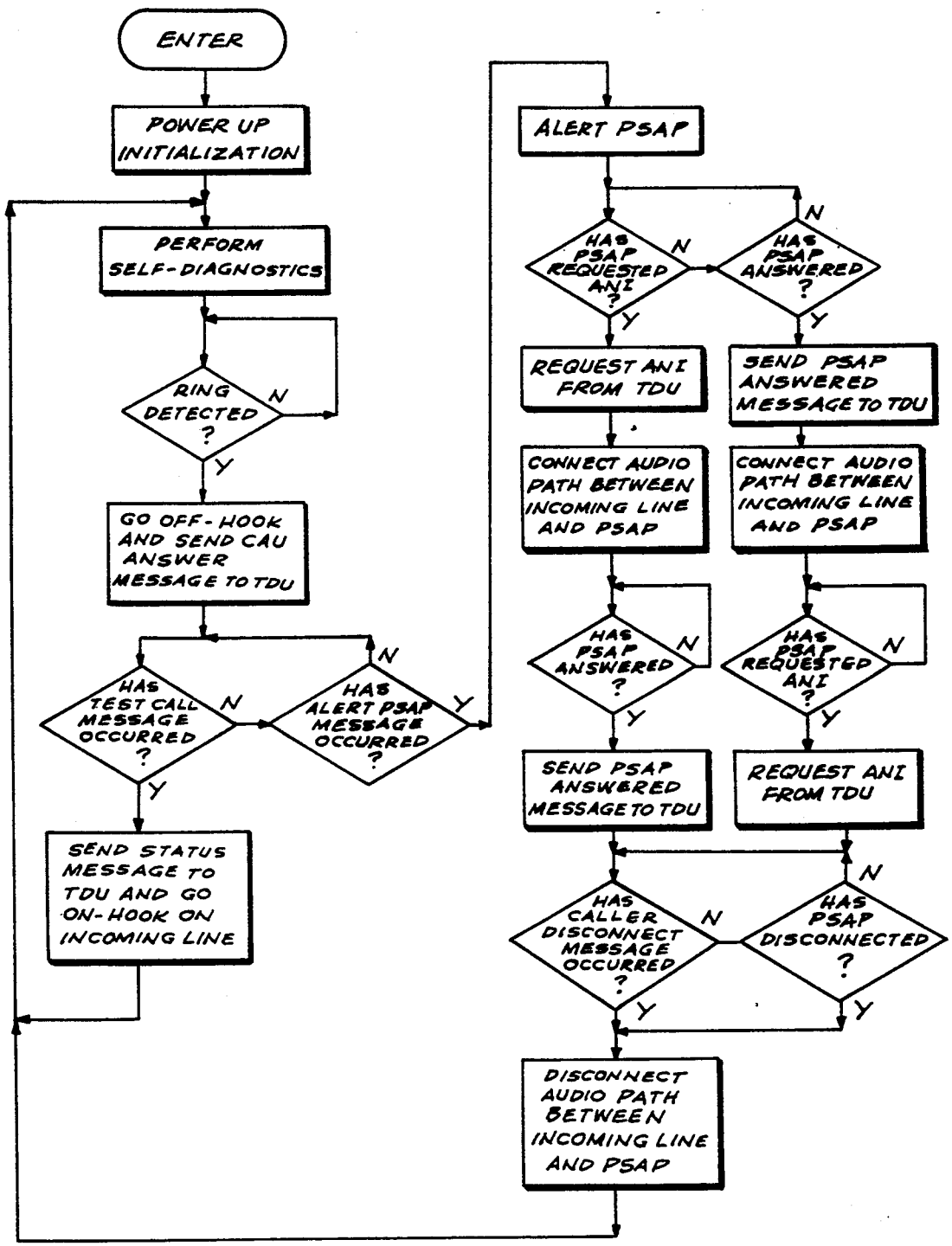
FIG. 11 is a flow diagram illustrating a program formed in accordance with the invention for controlling the operation of the CAU illustrated in FIG. 4.

FIG. 11 illustrates a CAU program loop suitable for controlling the CAU illustrated in FIG. 4. After power-up initialization, the CAU performs a self-diagnosis, i.e., determines if it is operating correctly. A status message is developed based on the results of the self-diagnosis. Thereafter, the CAU idles, i.e., waits until a ring is detected. This is accomplished by the CAU continuously testing the output of the ring detector 121. When a ring is detected, the loop hold circuit 127 causes the CAU incoming line to go off-hook. Then, the CAU sends an answer message to the TDU via the DTMF generator 113. Next, a test is made to determine if a test call message has occurred, i.e., the TDU has sent a test call message to the CAU. This is accomplished by the CPU 111 reading the output of the DTMF receiver 115. If the TDU has sent a test call message to the CDU, a CAU status message is sent to the TDU. As noted above, this message contains the results of the self-diagnostics step, namely, whether the status of the CAU is okay or not okay. Thereafter, the CAU goes on-hook on its incoming line and cycles to the point where the self-diagnostics test is performed. If a TDU test call message has not occurred, a test is made to determine if an alert PSAP message has occurred. If an alert PSAP message has not occurred, the "Has Test Call Message Occurred?" test is repeated.

If an alert PSAP message has occurred, the associated PSAP is alerted. Thereafter, a test is made to determine if the PSAP has requested ANI. If the PSAP has requested ANI, ANI is requested from the TDU. Thereafter, the audio path between the incoming line and the PSAP is connected. Then, a test is made to determine if the PSAP has answered. This test is repeated until the PSAP answers. When the PSAP answers, a PSAP answered message is sent to the TDU. Thereafter, a test is made to determine if a caller disconnect message has been received from the TDU. If a caller disconnect message has been received, the audio path between the incoming line and the PSAP is disconnected and the CAU program cycles to the point where the self-diagnostics step is performed.

As shown on the right side of FIG. 11, if the PSAP has not requested ANI, a test is made to determine if the PSAP has answered. If the PSAP has not answered, the "Has PSAP Requested ANI?" test is repeated. If the PSAP has answered, a PSAP-answered message is sent to the TDU. Then, the audio path between the incoming line and the PSAP is connected. Next, a test is made to determine if the PSAP has requested ANI. This test is repeated until the PSAP requests ANI. When the PSAP requests ANI, ANI is requested from the TDU. Then, the "Has Caller Disconnect Message Occurred?"

test is performed. If a caller disconnect message has not occurred, a test is made to determine if the PSAP has disconnected. If the PSAP has not disconnected, the "Has Caller Disconnect Message Occurred?" test is repeated. The program remains in this loop until either a caller disconnect message is received from the TDU or the PSAP disconnects. After one of these events occurs, the audio path between the incoming line and the PSAP is disconnected and the CAU program cycles to the self-diagnostics step.

As will be readily appreciated from the foregoing description, the invention provides a 9-1-1 switched access system that, while using the shared trunks of the public telephone network, has reliability equal to or greater than the reliability of a 9-1-1 system that uses dedicated lines. High reliability is achieved because the TDU and the CAUs continuously send messages to and receive messages from the CAU during idle periods of time. The self-diagnostics tests and the constant communication continuously makes certain that the TDU and the CAUs are operating correctly and lines and trunks are available to connect a 9-1-1 caller to a PSAP. In addition to constantly making certain that communication capability exits between a 9-1-1 central office and a primary PSAP CAU, the system has the ability to make certain that communication capability exists between alternate or secondary PSAPs and local PSAPs both on an always-available basis and on a time-of-day basis. In the event of failure of any system, i.e., the TDU or a CAU, or the public telephone network, alarms are created in response to which a user can correct the fault or reprogram the TDU, as best fits the situation.

While a preferred embodiment of the invention has been illustrated and described, it will be appreciated that various changes can be made therein without departing from the spirit and scope of the invention. For example, while the TDU illustrated in FIG. 3 has multi-frequency (MF) as well as dual-tone multi-frequency (DTMF) capability, obviously one or the other can be deleted in an actual embodiment of the invention if desired. Similarly, switching networks other than the one illustrated in FIG. 3 can be used to couple various detectors and receivers to the incoming trunk and the outgoing line. Further, alarm networks other than those illustrated in FIGS. 3 and 4 can be utilized, if desired. Also, program sequences other than the ones specifically described can be used. Consequently, within the scope of the appended claims, it is understood that the invention can be practiced otherwise than as specifically described herein.

The embodiments of the invention in which an exclusive property or privilege is claimed are defined as follows:

1. A 9-1-1 switched access system for creating a reliable emergency telephone communication channel between a central office that receives emergency calls and the telephone communication equipment of a public service answering point (PSAP) using the shared trunks of a public service telephone network (PTN), said 9-1-1 switched access system comprising:

(a) a public service telephone network (PTN) including at least a 9-1-1 central office and a PSAP central office, said 9-1-1 central office including line ports connected to a plurality of telephone subscribers and a trunk port to which emergency calls received from subscribers connected to the line ports are sent, said PSAP central office including a PSAP line port, said 9-1-1 central office and said PSAP central office connected together by shared trunks;

(b) a trunk dial unit (TDU) having an input connected to the trunk port of said 9-1-1 central office to which emergency calls are sent and an output connected to a line port of said 9-1-1 central office for:
  (i) dialing the number of said PSAP line port and coupling the input of said TDU to the output of said TDU, in response to a call from said 9-1-1 central office; and
  (ii) automatically dialing the number of said PSAP line port, sending a test call message, and generating an alarm if a response to said test call message is not received, in between responding to calls from said 9-1-1 central office; and (c) a call access unit (CAU) having an input connected to the PSAP line port of said PSAP central office and an output suitable for connection to the telephone communication equipment of a PSAP for:
  (i) applying an alert PSAP message to the output of said CAU and coupling the input of said CAU to the output of said CAU, in response to the receipt of a ring signal from said PSAP central office followed by the absence of a test call; and
  (ii) applying a response to the input of said CAU in response to the receipt of a ring signal from said PSAP central office followed by a test call.

2. The 9-1-1 switched access system claimed in claim 1, wherein: (i) said TDU sends an alert PSAP message after said TDU dials said PSAP line port in response to a call from said 9-1-1 central office; and (ii) said CAU applies said alert PSAP message to the output of said CAU after said CAU receives an alert PSAP message from said TDU.

3. The 9-1-1 switched access system claimed in claim 2, wherein said TDU continuously performs a self-diagnosis of its operability and creates an alarm if said self-diagnosis determines that said TDU is not operating correctly.

4. The 9-1-1 switched access system claimed in claim 3, wherein said CAU performs a self-diagnosis of its operability and wherein said CAU response to a ring signal from said PSAP central office followed by a test call is a test call status message, said test call status message containing information regarding the operable status of said CAU as determined by said self-diagnosis.

5. The 9-1-1 switched access system claimed in claim 4, wherein said TDU also generates an alarm if said status information contained in said test call status message indicates that said CAU is not operating correctly.

6. The 9-1-1 switched access system claimed in claim 5, wherein said TDU places a recovery call to said PSAP line port a predetermined period of time after said CAU fails to respond to a test call sent by said TDU or a predetermined time after said TDU receives a test call status message indicating that said CAU is not operating correctly.

7. The 9-1-1 switched access system claimed in claim 6, wherein (i) said 9-1-1 central office automatically generates number identification (ANI) information upon receipt of an emergency telephone call from a subscriber; (ii) said TDU also receives and stores said ANI information in response to a call from said 9-1-1 central office; and (iii) said TDU forwards said ANI information to said PSAP upon receipt of a request therefor from said CAU or said PSAP.

8. The 9-1-1 switched access system claimed in claim 7, including at least one alternate CAU having an input connected to a line port of a PSAP central office and an output suitable for connection to the telephone communication equipment of a PSAP, wherein said TDU dials said PSAP line port to which said alternate CAU is connected in response to a call from said 9-1-1 central office, if said first PSAP line port is busy.

9. The 9-1-1 switched access system claimed in claim 7, including at least one alternate CAU having an input connected to a line port of a PSAP central office and an output suitable for connection to the telephone communication equipment of a PSAP, wherein said TDU dials one or the other of said PSAP line ports in response to a call from said 9-1-1 central office, which PSAP line port is dialed being determined by the time of day when said 9-1-1 central office call occurs.

10. The 9-1-1 switched access system claimed in claim 1, wherein said TDU continuously performs a self-diagnosis of its operability and creates an alarm if said self-diagnosis determines that said TDU is not operating correctly.

11. The 9-1-1 switched access system claimed in claim 10, wherein said CAU performs a self-diagnosis of its operability and wherein said CAU response to a ring signal from said PSAP central office followed by a test call is a test call status message, said test call status message containing information regarding the operable status of said CAU as determined by said self-diagnosis.

12. The 9-1-1 switched access system claimed in claim 11, wherein said TDU also generates an alarm if said status information contained in said test call status message indicates that said CAU is not operating correctly.

13. The 9-1-1 switched access system claimed in claim 12, wherein said TDU places a recovery call to said PSAP line port a predetermined period of time after said CAU fails to respond to a test call sent by said TDU or a predetermined time after said TDU receives a test call status message indicating that said CAU is not operating correctly.

14. The 9-1-1 switched access system claimed in claim 13, wherein: (i) said 9-1-1 central office automatically generates number identification (ANI) information upon receipt of an emergency telephone call from a subscriber; (ii) said TDU also receives and stores said ANI information in response to a call from said 9-1-1 central office; and (iii) said TDU forwards said ANI information to said PSAP upon receipt of a request therefor from said CAU or said PSAP.

15. The 9-1-1 switched access system claimed in claim 14, including at least one alternate CAU having an input connected to a line port of a PSAP central office and an output suitable for connection to the telephone communication equipment of a PSAP, wherein said TDU dials said PSAP line port to which said alternate CAU is connected in response to a call from said 9-1-1 central office, if said first PSAP line port is busy.

16. The 9-1-1 switched access system claimed in claim 14, including at least one alternate CAU having an input connected to a line port of a PSAP central office and an output suitable for connection to the telephone communication equipment of a PSAP, wherein said TDU dials one or the other of said PSAP line ports in response to a call from said 9-1-1 central office, which PSAP line port is dialed being determined by the time of day when said 9-1-1 central office call occurs.

17. The 9-1-1 switched access system claimed in claim 1, wherein said CAU performs a self-diagnosis of its operability and wherein said CAU response to a ring signal from sais PSAP central office followed by a test call is a test call status message, said test call status message containing information regarding the operable status of said CAU as determined by said self-diagnosis.

18. The 9-1-1 switched access system claimed in claim 17, wherein said TDU also generates an alarm if said status information contained in said test call status message indicates that said CAU is not operating correctly.

19. The 9-1-1 switched access system claimed in claim 18, wherein said TDU places a recovery call to said PSAP line port a predetermined period of time after said CAU fails to respond to a test call sent by said TDU or a predetermined time after said TDU receives a test call status message indicating that said CAU is not operating correctly.

20. The 9-1-1 switched access system claimed in claim 19, wherein: (i) said 9-1-1 central office automatically generates number identification (ANI) information upon receipt of an emergency telephone call from a subscriber; (ii) said TDU also receives and stores said ANI information in response to a call from said 9-1-1 central office; and (iii) said TDU forwards said ANI information to said PSAP upon receipt of a request therefor from said CAU or said PSAP.

21. The 9-1-1 switched access system claimed in claim 20, including at least one alternate CAU having an input connected to a line port of a PSAP central office and an output suitable for connection to the telephone communication equipment of a PSAP, wherein said TDU dials said PSAP line port to which said alternate CAU is connected in response to a call from said 9-1-1 central office, if said first PSAP line port is busy.

22. The 9-1-1 switched access system claimed in claim 20, including at least one alternate CAU having an input connected to a line port of a PSAP central office and an output suitable for connection to the telephone communication equipment of a PSAP, wherein said TDU dials one or the other of said PSAP line ports in response to a call from said 9-1-1 central office, which PSAP line port is dialed being determined by the time of day when said 9-1-1 central office call occurs.

23. The 9-1-1 switched access system claimed in claim 1, wherein said TDU places a recovery call to said PSAP line port a predetermined period of time after said CAU fails to respond to a test call sent by said TDU.

24. The 9-1-1 switched access system claimed in claim 23, wherein (i) said 9-1-1 central office automatically generates number identification information (ANI) upon receipt of an emergency telephone call from a subscriber; (ii) said TDU also receives and stores said ANI information in response to a call from said 9-1-1 central office; and (iii) said TDU forwards said ANI information to said PSAP upon receipt of a request therefor from said CAU or said PSAP.

25. The 9-1-1 switched access system claimed in claim 24, including at least one alternate CAU having an input connected to a line port of a PSAP central office and an output suitable for connection to the telephone communication equipment of a PSAP, wherein said TDU dials said PSAP line port to which said alternate CAU is connected in response to a call from said 9-1-1 central office, if said first PSAP line port is busy.

26. The 9-1-1 switched access system claimed in claim 24, including at least one alternate CAU having an input connected to a line port of a PSAP central office and an output suitable for connection to the telephone communication equipment of a PSAP, wherein said TDU dials one or the other of said PSAP line ports in response to a call from said 9-1-1 central office, which PSAP line port is dialed being determined by the time of day when said 9-1-1 central office call occurs.

27. A trunk dial unit (TDU) suitable for use in a switched access system designed to create a reliable emergency telephone communication channel between a central office that receives emergency calls and the telephone communication equipment of a public service answering point (PSAP) using the shared trunks of a public service telephone network (PTN), said TDU comprising:
(a) an input suitable for connection to the trunk port of a central office to which emergency calls are sent;
(b) an output suitable for connection to a line port of said central office; and
(c) means for:
  (i) dialing the number of a PSAP line port of another (PSAP) central office, sending an alert PSAP message after receiving a response to the ring signal created by said other (PSAP) central office in response to said TDU dialing the number of said PSAP line port, and coupling the input of said TDU to the output of said TDU when a response to said alert PSAP message is received, in response to a call from said central office to which emergency calls are sent; and
  (ii) automatically dialing the number of said PSAP line port, sending a test call message in response to the ring signal generated by said PSAP central office in response to said TDU dialing the number of said PSAP line port, and generating an alarm if said TDU does not receive a response to said test call message, in between responding to calls from said central office to which emergency calls are sent.

28. The trunk dial unit (TDU) claimed in claim 27, wherein said TDU continuously performs a self-diagnosis of its operability and creates an alarm when said self-diagnosis determines that said TDU is not operating correctly.

29. The trunk dial unit (TDU) claimed in claim 28, wherein said TDU also generates an alarm if the response to said test call message received by said TDU contains status information indicating incorrect operation.

30. The trunk dial unit (TDU) claimed in claim 29, wherein said TDU places a recovery call to said PSAP line port a predetermined period of time after said TDU fails to receive a response to a test call message or a predetermined period of time after said TDU receives a test call message response indicating incorrect operation.

31. The trunk dial unit (TDU) claimed in claim 30, wherein: (i) said central office to which emergency calls are sent automatically generates number identification (ANI) information upon receipt of an emergency call from a subscriber; (ii) said TDU also receives and stores said ANI information in response to a call from said central office to which emergency calls are sent; and (iii) said TDU transmits said ANI information upon receipt of a request therefor.

32. A call access unit (CAU) for a 9-1-1 switched access system designed to create a reliable emergency telephone communication channel between a central office that receives emergency calls and the telephone communication equipment of a public service answering point (PSAP) using the shared trunks of a public service telephone network (PTN), said CAU comprising:
(a) an input suitable for connection to a line port of a central office;
(b) an output suitable for connection to the telephone communication equipment of a PSAP; and
(c) means for:
  (i) applying an alert signal to the output of said CAU and coupling the input of said CAU to the output of said CAU in response to the receipt of a ring signal only from a central office connected to the input of said CAU; and
  (ii) applying a response to the input of said CAU in response to the receipt of a ring signal followed by a message from a central office connected to the input of said CAU.

* * * * *